US005825355A

United States Patent [19]

Palmer et al.

[11] Patent Number: 5,825,355
[45] Date of Patent: Oct. 20, 1998

[54] METHOD AND APPARATUS FOR PROVIDING A HELP BASED WINDOW SYSTEM USING MULTIPLE ACCESS METHODS

[75] Inventors: James Edward Palmer, Redwood City; Patricia J. Coleman, Menlo Park; Jeffrey Alan Herman, Palo Alto; Eli Cochran, Menlo Park; John Richard Powers, III, Monte Sereno, all of Calif.

[73] Assignee: Apple Computer, Inc., Cupertino, Calif.

[21] Appl. No.: 10,063

[22] Filed: Jan. 27, 1993

[51] Int. Cl.⁶ .................................................. G06F 3/00
[52] U.S. Cl. ........................ 345/336; 345/341; 345/353; 345/968; 345/973; 345/974
[58] Field of Search ................................. 395/155–161; 345/117–120

[56] References Cited

U.S. PATENT DOCUMENTS

| Re. 32,632 | 3/1988 | Atkinson | 340/709 |
|---|---|---|---|
| 4,533,910 | 8/1985 | Sukonick et al. | 340/721 |
| 4,555,775 | 11/1985 | Pike | 364/900 |
| 4,622,545 | 11/1986 | Atkinson | 340/747 |
| 4,648,062 | 3/1987 | Johnson et al. | 395/161 X |
| 4,689,737 | 8/1987 | Grant | 364/200 |
| 4,748,618 | 5/1988 | Brown et al. | 370/94 |
| 4,772,882 | 9/1988 | Mical | 340/709 |
| 4,785,408 | 11/1988 | Hakura | 364/513.5 |
| 4,812,834 | 3/1989 | Wells | 340/721 |
| 4,831,556 | 5/1989 | Oono | 345/342 |

(List continued on next page.)

FOREIGN PATENT DOCUMENTS

| 0325443 | 7/1989 | European Pat. Off. | G06F 3/00 |
|---|---|---|---|
| 0342964 | 11/1989 | European Pat. Off. | G06F 3/00 |
| 0428261 | 5/1991 | European Pat. Off. | G06F 3/00 |
| 92/08184 | 5/1992 | WIPO | G06F 3/00 |

OTHER PUBLICATIONS

Alexander, Visualizing cleared–off desktops, *Computer-World*, May 6, 1991, p. 20.

Hiroshi Ishii, Kazuho Artia, Clearface: Translucent Multiuser Interface for TeamWorkStation, *ECSCW*, Sep., 1991, pp. 6–10.

Hiroshi Ishii, Naomi Miyaka, Toward an Open Shared Workspace, *Communications of the ACM*, Dec., 1991, vol. 34, No. 12, pp. 37–50.

(List continued on next page.)

*Primary Examiner*—John E. Breene
*Attorney, Agent, or Firm*—Blakely, Sokoloff, Taylor & Zafman

[57] ABSTRACT

The system includes at least one central processing unit (CPU) which is coupled through appropriate input/output (I/O) circuitry to input devices, such as a keyboard, digital pad, mouse and/or track ball. The CPU is coupled to a hard disk drive for the storage of programs and data, and may also be coupled to a network through which the CPU may communicate with a variety of other system resources and devices. The CPU is further coupled to a display device such as a CRT or liquid crystal display, on which the present invention is displayed. The user interface of the present invention includes an object oriented graphic user interface having overlapping windows. The present invention includes an access window having topics, index and look for button functions for selection by a user. Through the use of the topics, index or look for functions, a help inquiry is defined. The selection of one of the button functions results in the CPU generating and displaying entries in a predefined area of the access window. Upon the selection of one of the entries by a user, the CPU displays phrases related to the selected entry in a working area of the access window. The selection of one of the phrases results in the CPU displaying a presentation window on the display, which includes help instruction data to guide the user in the particular help task specified by the entry and phrase selection.

1 Claim, 24 Drawing Sheets

U.S. PATENT DOCUMENTS

| | | | |
|---|---|---|---|
| 4,847,604 | 7/1989 | Doyle | 340/706 |
| 4,884,223 | 11/1989 | Ingle | 364/550 |
| 4,899,136 | 2/1990 | Beard et al. | 340/706 |
| 4,899,377 | 2/1990 | Bauer et al. | 345/340 |
| 4,914,732 | 4/1990 | Henderson et al. | 340/825 |
| 4,931,783 | 6/1990 | Atkinson | 340/710 |
| 4,935,865 | 6/1990 | Rowe et al. | 364/188 |
| 4,939,507 | 7/1990 | Beard et al. | 340/706 |
| 4,939,508 | 7/1990 | Lawrence et al. | 345/336 |
| 4,961,070 | 10/1990 | Maher et al. | 345/336 |
| 5,050,105 | 9/1991 | Peters | 345/339 |
| 5,062,060 | 10/1991 | Kolnick | 345/342 |
| 5,072,412 | 12/1991 | Henderson et al. | 395/159 |
| 5,148,154 | 9/1992 | MacKay et al. | 345/333 X |
| 5,155,806 | 10/1992 | Hoeber et al. | 395/157 |
| 5,157,768 | 10/1992 | Hoeber et al. | 395/157 |
| 5,179,654 | 1/1993 | Richards et al. | 395/161 X |
| 5,287,448 | 2/1994 | Nicol et al. | 345/336 |

OTHER PUBLICATIONS

Article entitled: Learning Considerations In User Interface Design: The Room Model; author: Patrick P. Chan; publication of the Software Portability Laboratory, University of Waterloo, Waterloo, Ontario, Canada, July, 1984.

Article entitled: Creation/Modification of the Audio Signal Processor Setup For A PC Audio Editor; publication of International Business Machines, IBM Technical Disclosure Bulletin, vol. 30, No. 10, Mar. 1988.

Article entitled: Browsing Within Time–Driven Multimedia Documents; authors: Stavros Christodoulakis and Steven Graham; publication of the Institute for Computer Research, University of Waterloo, Waterloo, Ontario, Canada, Jul., 1988.

"Improved Method for Help Lookups", IBM Tech. Discl. Bull, Jun. 1986, pp. 291–292.

Advanced laterface Design Guide, IBM, Jun. 1989, pp. 59–61, 89–91.

The Worksheet Utilities, Funk Software, 1987, pp. 10–20, 48–60.

Word Perfect for Windows, WordPerfect Corp., Apr. 1992, Screen pp. 1–28.

HyperCard® Basics Manual and 3.5 Diskette containing HyperCard® Program Version 2.1, Apple Computer, Inc. (1991).

Goodman, D., *The Complete HyperCard Handbook*, Bantam Books, Inc., pp. 34–39 (1987).

Seven pages of screen images of Microsoft Windows Program Manager, Version 3.1, Microsoft Corp (1992).

PCT International Search Report for PCT International Application No. PCT/US94/00919.

PCT International Search Report for PCT International Application No. PCT/US94/00912.

"Non–Verbal Animated Help Screen Function", *IBM Technical Disclosure Bulletin*, vol. 34, No. 8, pp. 208–209 (Jan. 1992).

"OS/2: Contextual Animated–Open Window Control," *IBM Technical Disclosure Bulletin*, vol. 34, No. 11, pp. 68–69 (Apr. 1992).

"Presenting Messages on an Object That is Not Currently Being Worked On," *IBM Technical Disclosure Bulletin*, vol. 35, No. 6, pp. 99–101 (Nov. 1992).

Cowart, R., *Mastering Windows 3.1*, SYBEX Inc., Alameda, CA, pp. xxxiv, 31–36, 67 and 114–115 (1993).

METHOD AND APPARATUS FOR PROVIDING A HELP BASED WINDOW SYSTEM USING MULTIPLE ACCESS METHODS

A portion of the disclosure of this patent document contains material, such as illustrations of graphical user interface images, which is protected by copyrights owned by the assignee of the present invention. The assignee hereby reserves it rights, including copyrights, in these materials, and each such material should be regarded as bearing the following notice: Copyright Apple Computer, Inc. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention relates to apparatus and methods for displaying graphic information, and more particularly, the present invention relates to a computer controlled display system for displaying and manipulating overlapping windows of data on a display.

2. Art Background

Over the past decade, a variety of graphic user interfaces have been developed to ease human interaction with computer systems. Many user interfaces utilize metaphors in the design of the interface as a way of maximizing human familiarity, and conveying information between the user and computer. Through the use of familiar metaphors, such as desk tops, notebooks and the like, the interface takes advantage of existing human mental structures to permit a user to draw upon the metaphor analogy to understand the requirements of the particular computer system. It is well known that designing around a familiar metaphor helps reduce human learning time. See for example, Patrick Chan *"Learning Considerations in User Interface Design: The Room Model"*, Report CS-84-16, University of Waterloo Computer Science Department, Ontario, Canada, July, 1984, and references cited therein.

In current generation systems, it is common for computer systems to incorporate so-called "object oriented" display systems which utilize multiple "windows" on a display in which combinations of text and graphics are disposed. Using a desk top metaphor, the windows may take the form of a variety of objects, such a file folders, loose leaf binders, or simple rectangles, and the windows may overlap one another with the "top" window constituting the current work file. A user operating within the context of a window-based graphic user interface ("GUI") operates on objects commonly found in an office, and therefore, provides non expert users with a familiar surrounding in which to interact with the computer.

In a typical window-based GUI system, visually distinct display objects are provided on the display screen, and are commonly referred to as "icons". Each of the icons represents a function or object on the desktop. In many systems, a cursor is also displayed which may be selectively moved in response to the movement of a mouse or other pointer control device. The cursor may be moved over display objects which the user may select on the screen. The user may delete information from a window, move data from one window to another, and generally operate on the windows as if an actual file or other physical object is being manipulated.

A variety of "pull-down" menus also may be displayed, using a technique for selecting particular command options appearing along a menu bar, and subcommand items corresponding to the command options (See Re. U.S. Pat. No. 32,632).

The reader is referred to the following references which describe various aspects, methods and apparatus associated with prior art graphic user interface design: Re. U.S. Pat. No. 32,632, U.S. Pat. No. 4,931,783, U.S. Pat. No. 5,072,412, and U.S. Pat. No. 5,148,154, and the references cited therein.

Although object oriented display systems have shortened the learning and acclamation period of a new user in understanding and operating computer systems, users still require assistance during the actual operation of the computer system. As a result, a variety of on-screen help systems have been developed using window-based graphic user interfaces. Some systems provide a help key which displays on-screen manuals for the reader to review while operating in the particular application program. Other help based systems, such as the balloon help system which forms a part of System 7.0 of the Apple Macintosh® graphic user interface, provides context sensitive help information by placing the cursor over various icons, labels, windows and other objects on the screen desktop. (See Macintosh® user manuals published by Apple Computer, Inc.)

An intuitive help interface design, as in the case of graphic user interfaces generally, relies on a real world metaphor to permit users to apply common knowledge about the metaphor and operate the computer system. However, it is difficult to define what constitutes an "intuitive" design for a user interface, and it is difficult to design an interface that is completely apparent to all end users, no matter which metaphor is used. As a result, it is desirable to provide a help system which is context sensitive and works in conjunction with the graphic user interface metaphor to assist the user.

As will be described, the present invention provides an on-screen help system having attributes which ease the acclamation and learning period of the user. The help system of the present invention provides the full benefits of on-screen help, as opposed to the requirement of the user reading a printed manual, and context sensitivity in the application in which the user is working. Window features are provided which distinguish the help window from other windows on the display, and additional features have been added which coach the user through the use of help to accomplish the desired function. Although the present invention is described in terms of an on-screen help system in a window-based graphic user interface, it will be apparent from the description below, that the present invention's features and attributes have application in a variety of graphic user interface designs and software applications. Accordingly, the present invention is not limited by the following description, and it will be understood by those skilled in the art, that the present invention may be applied to computer systems offered by a variety of manufacturers, and to user interface designs which utilize a variety of metaphors.

SUMMARY OF THE INVENTION

The present invention provides apparatus and methods for a help interface for use in a window-based computer display system. The display system includes at least one central processing unit (CPU) which is coupled through appropriate input/output (I/O) circuitry to input devices, such as a keyboard, digital pad, mouse and/or track ball. The CPU is coupled to a hard disk drive for the storage of programs and data, and may also be coupled to a network through which the CPU may communicate with a variety of other system resources and devices. The CPU is further coupled to a display device such as a CRT or liquid crystal display, on which the present invention is displayed. The user interface of the present invention includes an object oriented graphic user interface having overlapping windows. The present invention includes an access window having topics, index and look for button functions for selection by a user. Through the use of the topics, index or look for functions, a help inquiry is defined. The selection of one of the button functions results in the CPU generating and displaying entries in a predefined area of the access window. Upon the selection of one of the entries by a user, the CPU displays phrases related to the selected entry in a working area of the access window. The selection of one of the phrases results in the CPU displaying a presentation window on the display, which includes help instruction data to guide the user in the particular help task specified by the entry and phrase selection. To further assist the user, the present invention includes coach marks generated by the CPU for identifying features on the display which relate to the information disposed within the presentation window. The coach marks are displayed generally concurrently with the display of the presentation window, and appear to approximate a geometric object, such as, for example, an arrow, a circle, an X, and the like.

NOTATION AND NOMENCLATURE

Figure 1:
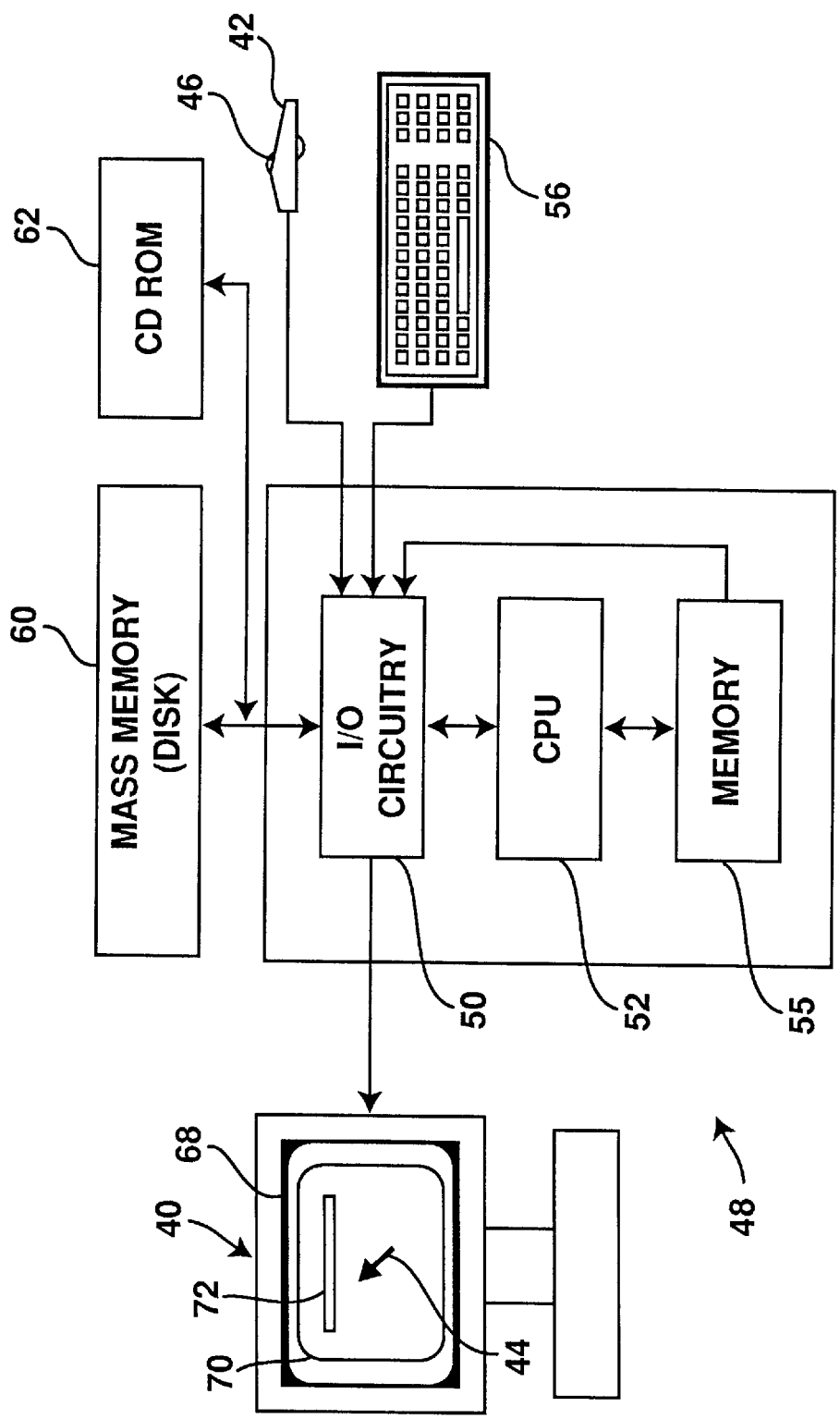
FIG. 1 is a functional block diagram illustrating one possible computer display system incorporating the teachings of the present invention.

The detailed descriptions which follow are presented largely in terms of display images, algorithms, and symbolic representations of operations of data bits within a computer memory. These algorithmic descriptions and representations are the means used by those skilled in the data processing arts to most effectively convey the substance of their work to others skilled in the art.

An algorithm is here, and generally, conceived to be a self consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, images, terms, numbers, or the like. It should be borne in mind, however, that all of these and similar terms are to be associated with the appropriate physical quantities and are merely convenient labels applied to these quantities.

In the present case, the operations are machine operations performed in conjunction with a human operator. Useful machines for performing the operations of the present invention include general purpose digital computers or other similar devices. In all cases, there should be borne in mind the distinction between the method operations of operating a computer and the method of computation itself. The present invention relates to method steps for operating a computer and processing electrical or other physical signals to generate other desired physical signals.

The present invention also relates to apparatus for performing these operations. This apparatus may be specially constructed for the required purposes or it may comprise a general purpose computer selectively activated or reconfigured by a computer program stored in the computer. The algorithms presented herein are not inherently related to any particular computer or other apparatus. In particular, various general purpose machines may be used with programs in accordance with the teachings herein, or it may prove more convenient to construct more specialized apparatus to perform the required method steps. The required structure for a variety of these machines will appear from the description given below. Machines which may perform the functions of the present invention include those manufactured by the Assignee, Apple Computer, Inc., as well as other manufacturers of computer systems.

DETAILED DESCRIPTION OF THE INVENTION

This Specification is related to, and hereby fully incorporates by reference, the following related Specifications filed on the same day, and assigned to the same assignee, Apple Computer, Inc.:

Ser. No. 08/010,062, Filed Jan. 27, 1993, entitled "Method And Apparatus For Providing Visual Cues In A Graphic User Interface"; Ser. No. 08/010,061, Filed Jan. 27, 1993, entitled "Method and Apparatus For Displaying And Scrolling Data In A Window-Based Graphic User Interface"; and Ser. No. 08/010,064, filed Jan. 27, 1993, entitled "Method And Apparatus For Presenting Information In A Display Using Floating Windows."

The following detailed description will be divided into several sections. The first of these will describe a general system arrangement for generating computer graphics in accordance with the teachings of the present invention. Subsequent sections will deal with aspects of the present invention such as the present invention's help access methods and presentation window, alpha slider selection method, floating windows, and computer generated coach marks, as well as the overall structure and operation of the present invention's user interface.

In addition, in the following description, numerous specific details are set forth such as functional blocks representing data processing devices, metaphors, such as desktop and window metaphors, window configurations and arrangements, etc. in order to provide a thorough understanding of the present invention. However, it will be apparent to one skilled in the art that the present invention may be practiced without the specific details. In other instances, well known circuits and structures are not described in detail so as not to obscure the present invention unnecessarily.

General System Configuration

The computer controlled display system of the present invention is part of a computer system, such as that illustrated in FIG. 1. The computer controlled display system includes a display means 40, such as a CRT monitor or a liquid crystal display (LCD), and further includes a cursor control means 42, such as a mouse of the type shown in Re. U.S. Pat. No. 32,632, a track ball, joy stick or other device for selectively positioning a cursor 44 on a display screen 68 of the display 40. Typically, the cursor control means 42 includes a signal generation means, such as a switch 46 having a first position and a second position. For example, the mouse shown and described in Re. U.S. Pat. No. 32,632 includes a switch which the user of the computer system uses to generate signals directing the computer to execute certain commands. As illustrated, the cursor control means 42 (hereinafter all types of applicable cursor control devices, such as mice, track balls, joy sticks, graphic tablets, keyboard inputs, and the like, are collectively referred to as the "mouse 42") is coupled to a computer system 48.

The computer 48 comprises three major components. The first of these is an input/output (I/O) circuit 50 which is used to communicate information in appropriately structured form to and from other portions of the computer 48. In addition, the computer 48 includes a central processing unit (CPU) 52 coupled to the I/O circuit 50 and a memory 55. These elements are those typically found in most general purpose computers, and in fact, computer 48 is intended to be representative of a broad category of data processing devices capable of generating graphic displays.

Also shown in FIG. 1 is a keyboard 56 to input data and commands into the computer 48, as is well known in the art. A magnetic mass memory disk 60 is shown coupled to I/O circuit 50 to provide additional storage capability for the computer 48. In addition, a CD ROM 62 is further coupled to the I/O circuit 50 for additional storage capacity. It will be appreciated that additional devices may be coupled to the computer 48 for storing data, such as magnetic tape drives, as well as networks, which are in turn coupled to other data processing systems.

As illustrated in FIG. 1, the display 40 includes the display screen 68 in which a window 70 is displayed. As is well known in the art, the window 70 may be in the form of a rectangle or other well known shape, and may include a menu bar 72 disposed horizontally across the length of the window. As is well known, the movement of the mouse 42 may be translated by the computer 48 into movement of the cursor 44 on the display screen 70. The reader is referred to literature cited in the background describing object-oriented display systems generally, and in particular, desktop metaphor window-based systems for additional description related to other computer systems which may be utilized in accordance with the teachings of the present invention. The system illustrated in FIG. 1 is intended to represent a general data processing system capable of providing a graphic user interface display. The window display 70 and window based display system shown in FIG. 1 is well known (for example, the Macintosh® series of computers sold by Apple Computer, Inc.), and hence, a detailed description is not necessary herein. In operation, the window based user interface of the present invention is generated and displayed using software stored in memory 55 and executed by the CPU 52, as is known.

Access And Presentation Windows

Figure 2:
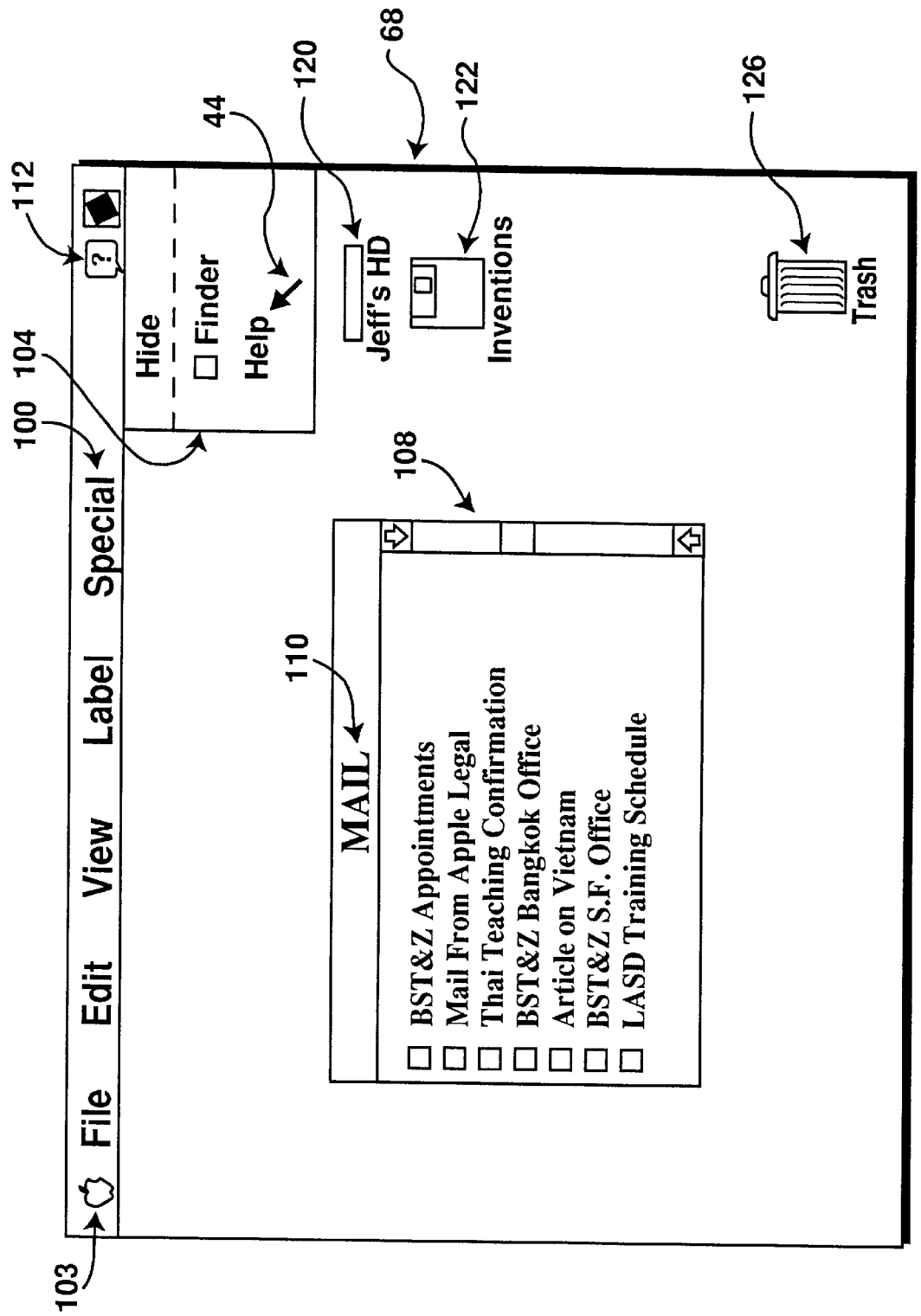
FIG. 2 shows a representative display screen illustrating a window-display system utilizing the teachings of the present invention.

Referring now to FIG. 2, the display screen 68 of the display 40 is shown in additional detail. Illustrated within the display 68, is a known graphic user interface utilized by computers manufactured and sold by Apple Computer, Inc. A menu bar 100 is provided which horizontally spans the display screen 68. As shown in FIG. 2 the menu bar 100 typically includes a plurality of command options such as a desktop icon in the shape of an Apple 103, "File", "Edit", "View", "Label", and "Special". Using the teachings of Re. U.S. Pat. No. 32,632 and U.S. Pat. No. 4,931,783, pull down menus may be displayed and selected using a methodology commonly referred to as a "push-drag-release" method. Using this methodology, the cursor 44 is placed over a desired command option, after which the switch 46 of the mouse 42 is depressed. The depression of the switch 46 signals the CPU 52 to generate a pull down menu (In FIG. 2, a sample pull down menu is shown as menu 104.). Moving the mouse 42, and maintaining the switch 46 in a depressed state, the user places the cursor 102 over a desired subcommand item (in the example of FIG. 2, the "help" command), and releases the switch 46. The computer system 48 then executes the selected subcommand item. As will be described, the selection of the subcommand item "help" in menu 104 results in the CPU executing the help system disclosed herein. In addition, for purposes of this Specification and the description which follows, a reference to placing the cursor 44 "over" an object, icon, list, question or the like, shall be understood to mean placing the cursor 44 over at least a portion of the object, icon, list, question or the like sufficient to identify the selection to the CPU 52.

Shown within the desktop illustrated in FIG. 2 is a window 108 which includes a header 110 entitled "Mail". In the example illustrated, the window 108 lists a variety of documents, messages and the like, which are disposed within the window 108. Other icons are shown, such as icon 120 entitled "Jeff's HD", which represents a hard disk, and icon 122, which represents a floppy disk to which the CPU 52 has access, and trash can icon 126.

In the presently preferred embodiment, the help system of the present invention is initiated by the user selecting the subcommand item identified as "Help" disposed in the pull down menu 104. To select "Help", the cursor 44 is placed over balloon help menu icon 112, and switch 46 is depressed. CPU 52 generates and displays menu 104, and the user then places cursor 44 over the "Help" subcommand, and releases switch 46. Alternatively, the user may select the "Help" function by inputting a predetermined keyboard equivalent using keyboard 56.

Figure 3:
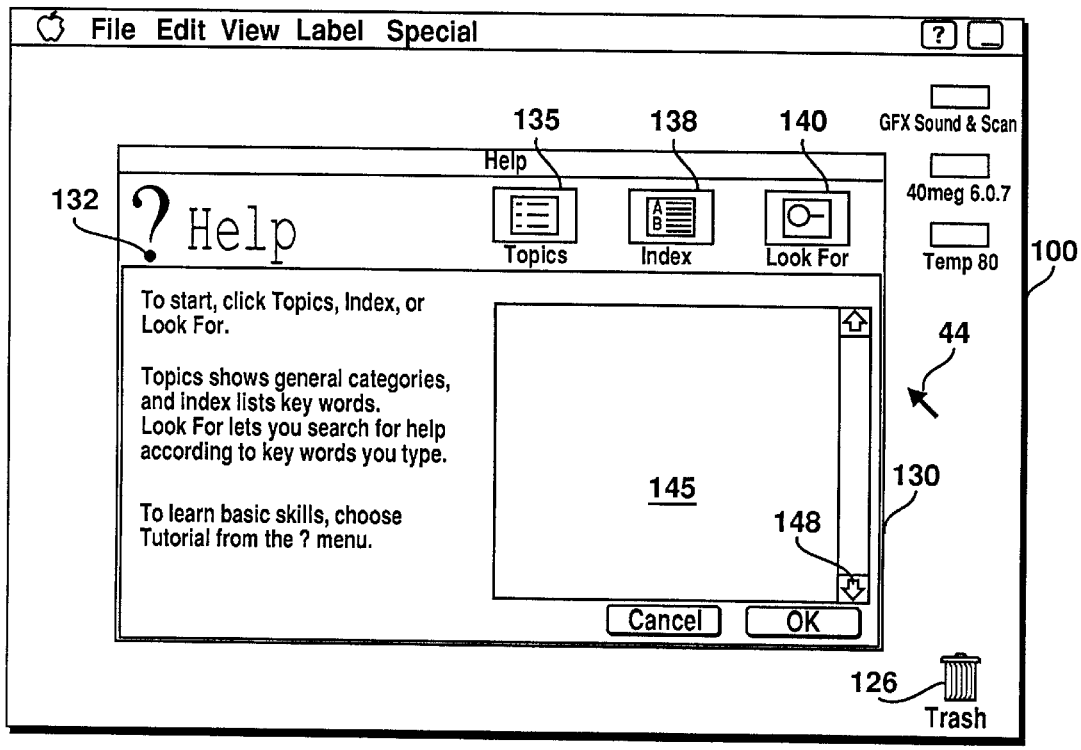
FIG. 3 is the access window of the present invention.

Upon selection of the "Help" function, the computer 48 generates and displays a help screen access window 130, illustrated in FIG. 3. The access window 130 includes a logo 132 and user instructions, as illustrated. In the presently preferred embodiment, the instructions shown within the access window 130, logo 132 and the window itself are part of a help data base stored in memory 55, or alternatively, on disk 60 or CD ROM 62. Access to the help data base is provided to the user through a topics button 135, an index button 138, and a lookup button 140, as will be described. In addition, as illustrated in FIG. 3, the access window 130 includes a working area 145 in which the CPU 52 displays instructions, text or command options. The working area 145 includes a vertical slider 148 for scrolling through data displayed within the working area 145. Additional features of the access window 130 will become apparent from the description below.

Figure 4:
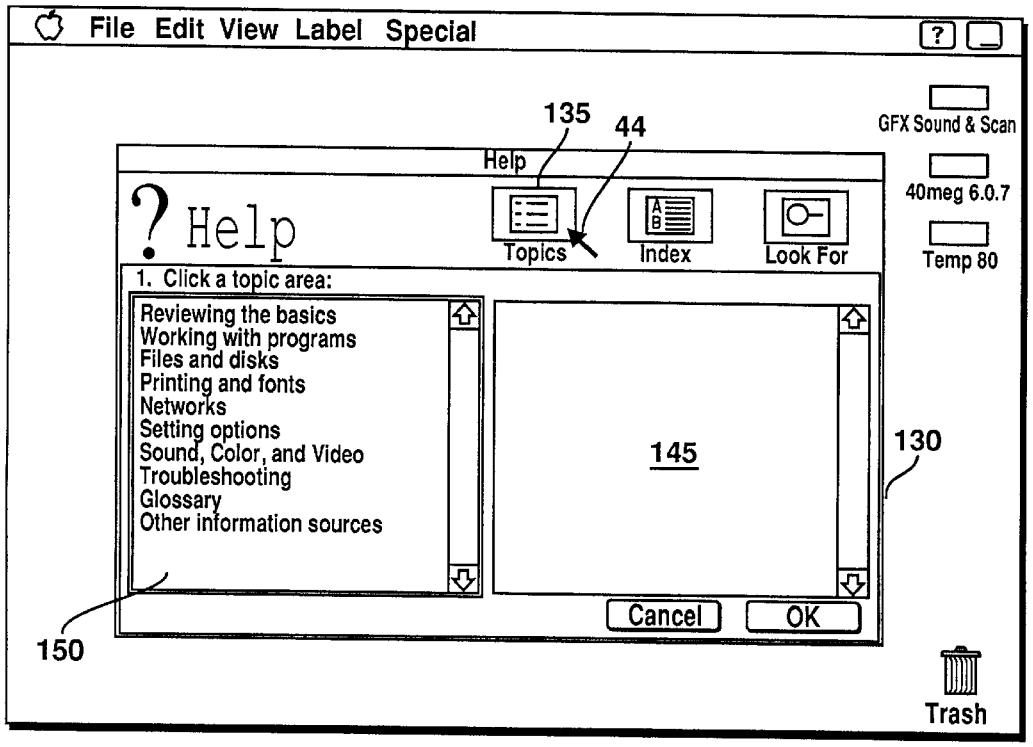
FIG. 4 illustrates the access window as shown in FIG. 3 once the topics screen has been selected.

Referring now to FIG. 4, the selection of the topics access method for the access window 130 is illustrated. As shown, to enter the present invention's help system through the "topics" button function, the user places the cursor 44 over the button marked topics (135) and momentarily activates ("clicks") the switch 46 on the mouse 42. In the present embodiment, while the cursor 44 is within the rectangle defining the button 135 and the button 46 of mouse 42 is depressed, the image of button 135 appears to be inverted as if it were being depressed. When the switch 46 on the mouse 42 is clicked over the topics button 135, CPU 52 generates and displays the access window 130 including a list of topics within a working area 150 as shown in FIG. 4.

Figure 5:
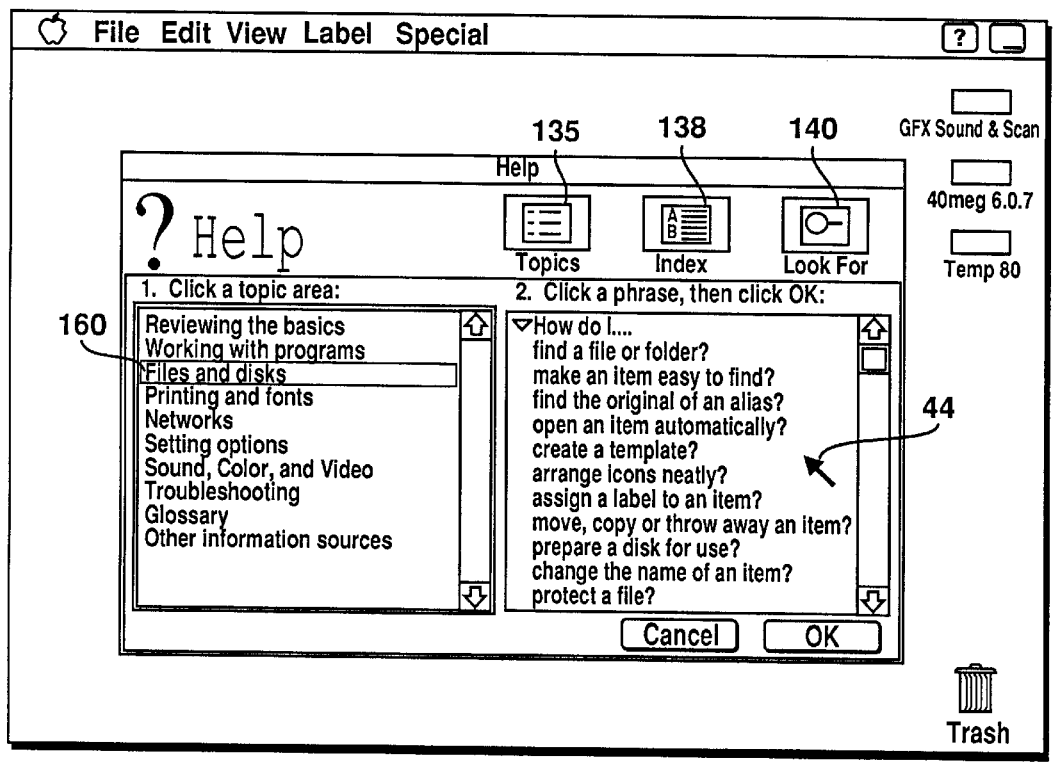
FIG. 5 illustrates the access window of FIG. 4 once the topic area for "files and disks" has been selected.

As illustrated, the user may then select one of a plurality of topics which the user desires help in. For example, in FIG. 5, if the user places the cursor 44 over the topic "Files and Disks" 160, and clicks button 46, the selection of the topic is sensed by the CPU 52, which then generates and displays a list of statements within the working area 145. In the present embodiment, the list displayed within the working area 145 comprises statements in groups which may include questions. The heading is a set of words that begins all statements or questions of a particular type (in the example of FIG. 5, "How do I"). The body is the remainder of the question or statement (for example in FIG. 5 "Change the name of an item"). In the presently preferred embodiment, the CPU 52 displays the headings in bold. The bodies of the questions or statements appear indented under the heading as shown in the figures. The invention's hierarchical design preserves the statement's format, while removing the redundant heading from each statement in the list. As a result, the list of statements has less text, and longer statements or questions fit more easily in the working area 145. In addition, users can easily scan the headings to see the types of statements or questions that are available, using the scroll bar 148.

Figure 6:
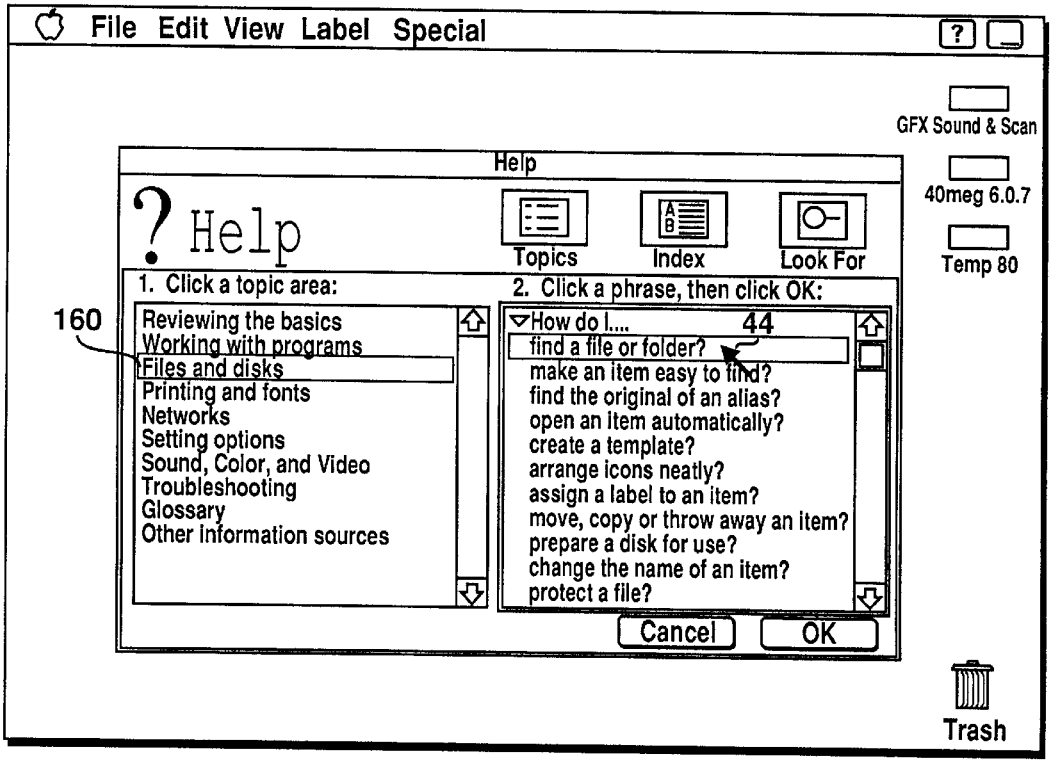
FIG. 6 illustrates the access window of FIG. 5 and shows the selection of "How do I find a file or folder?" being selected.

Referring now to FIG. 6, as illustrated, the topic area "files and disks" 160 provides the results in the illustrated questions shown. In the example of FIG. 6, the cursor 44 is placed through the appropriate movement of the mouse 42 by the user, over the question "Find a file or folder?", and the switch 46 is momentarily clicked. Selection of the question "How do I find a file or folder?", coupled with placing the cursor 44 over the "OK" button and clicking switch 46 again, results in CPU 52 generating and displaying a presentation window 165 illustrated in FIG. 7. Data and other information provided within the presentation window 165 requests additional information from the user (if required) and guides the user through the desired function. As will be described more fully below, both the access window 130 and the presentation window 165 "float" over other windows displayed on the display screen 68, without disturbing or altering the currently active window being displayed.

Figure 8:
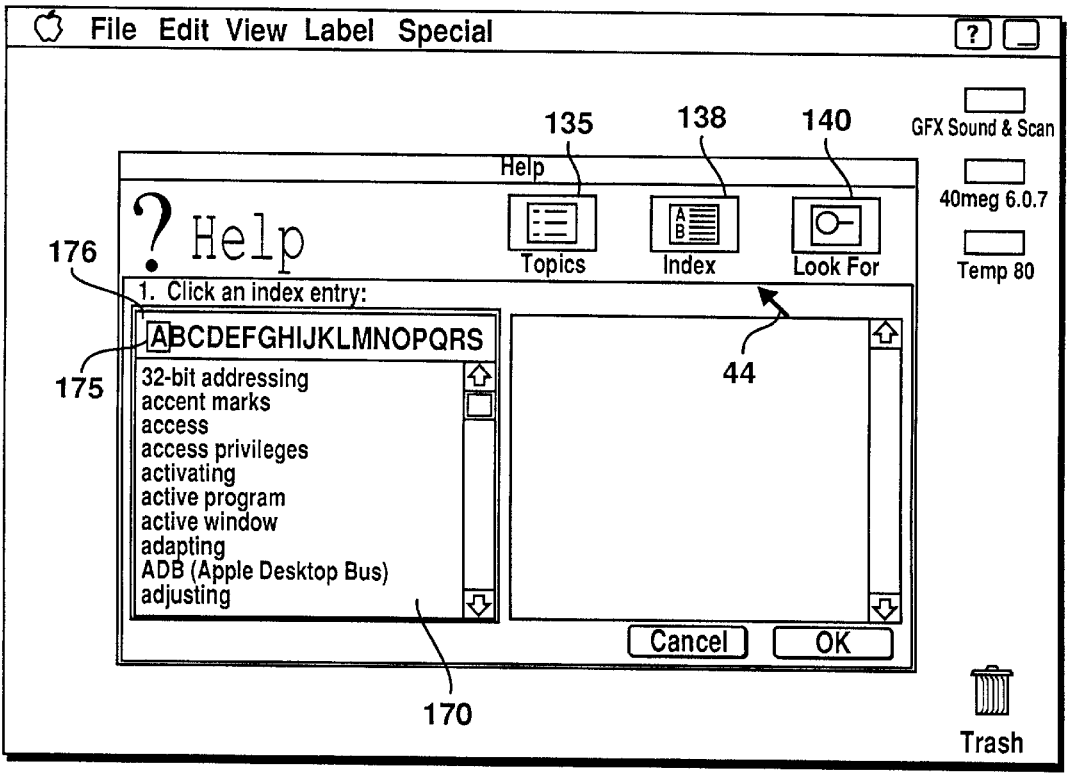
FIG. 8 illustrates the access window of the present invention showing the selection of the index screen and the present invention's alpha slider.

Referring now to FIG. 8, help information may also be obtained through the selection of the index button function 138. The placement of the cursor 44 over index button 138, and the momentary clicking of switch 46 on the mouse 42, signals the CPU of the selection of the index function 138. As illustrated in FIG. 8, upon the selection of index button 138, the index 170 is generated and displayed. The index allows users to find relevant questions based on specific terms and phrases (referred to collectively as "index entries"). The index screen 170 includes a plurality of entries, and the index button 138 remains inverted to indicate the function is active. The index screen 170 includes an alpha scroll bar 176. Since the index screen 170 contains many entries, the alpha scroll bar 176 allows users to scroll rapidly to a particular letter, similar to a rolodex on a desk. The operation of the alpha scroll bar 176 will be described in more detail below.

Figure 7:
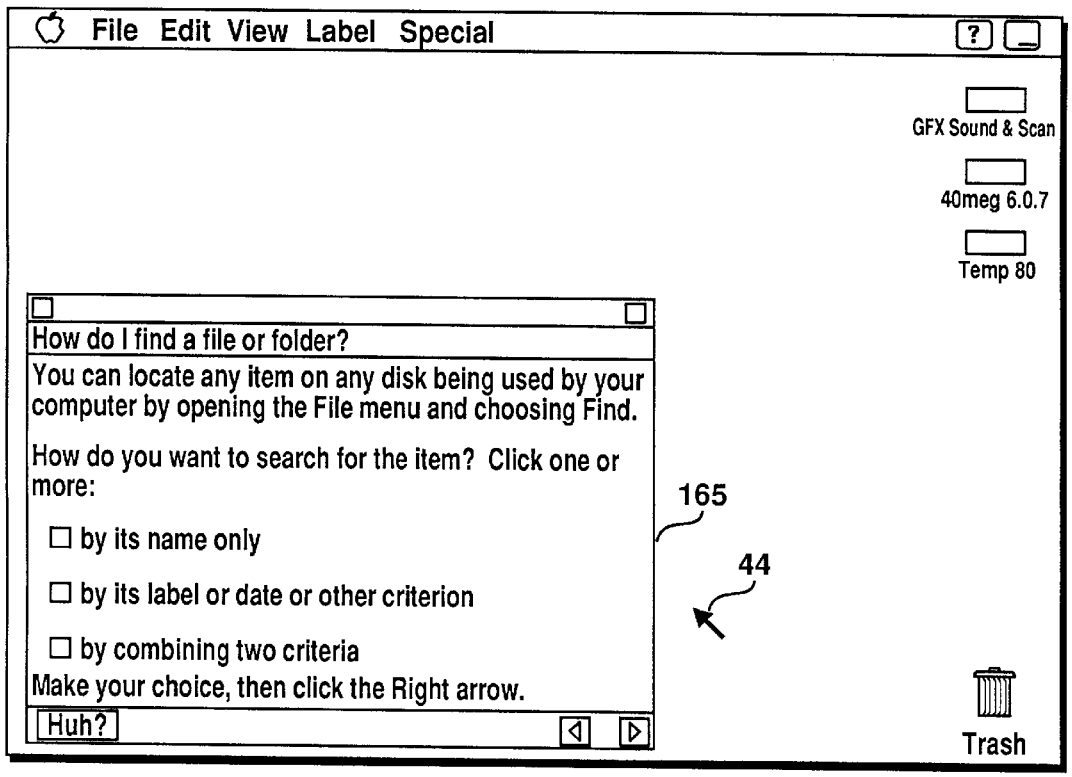
FIG. 7 illustrates a presentation window entitled "How do I find a file or folder?" displayed subsequent to the selection illustrated in FIG. 6.
Figure 9:
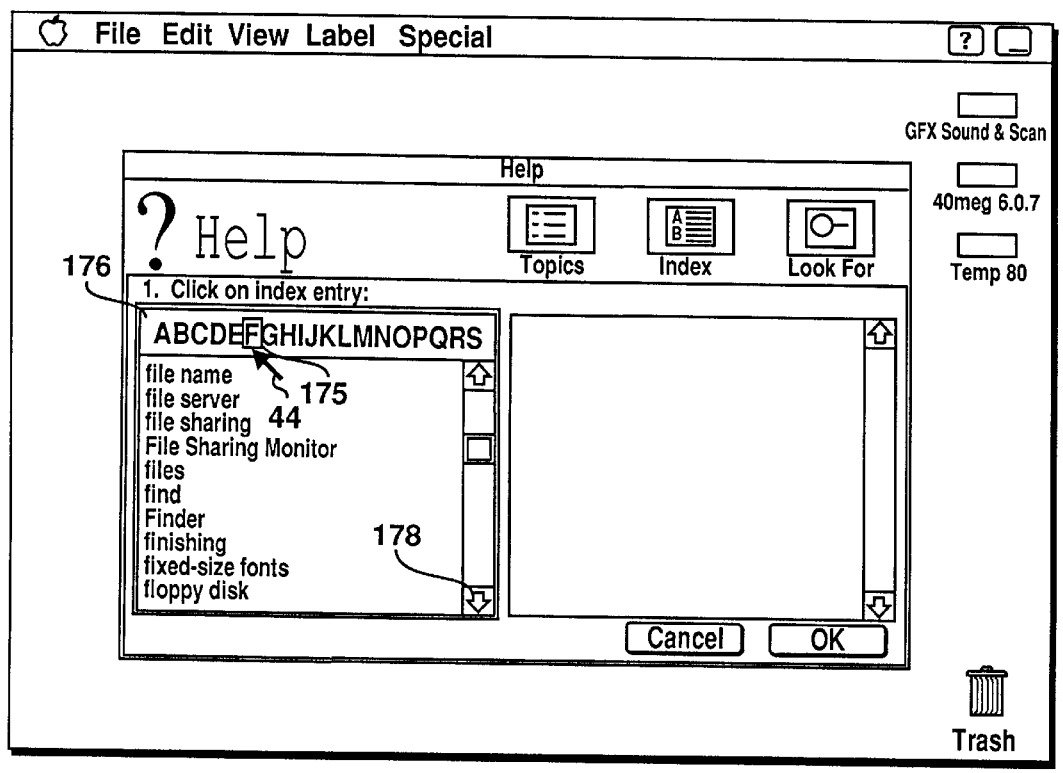
FIG. 9 illustrates the present invention's alpha slider placed on the letter "F" contents of the alpha index window within the access window.
Figure 10:
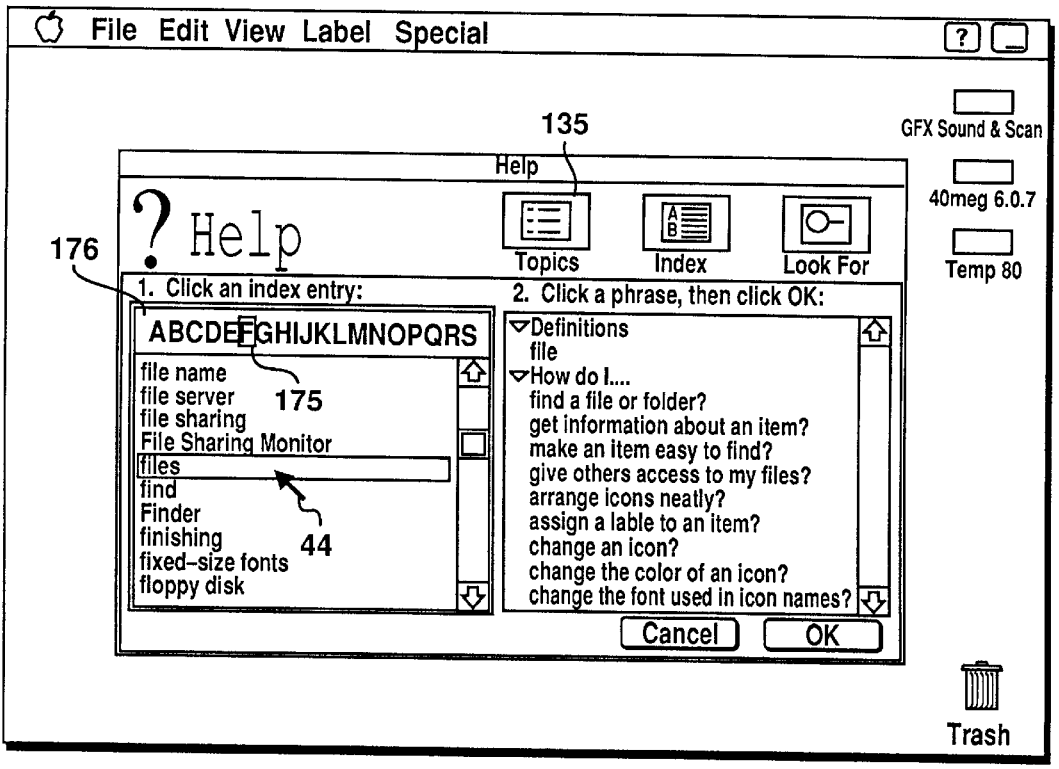
FIGS. 10 illustrates the access window of FIG. 9 once the "files" entry has been selected in the alpha window.
Figure 11:
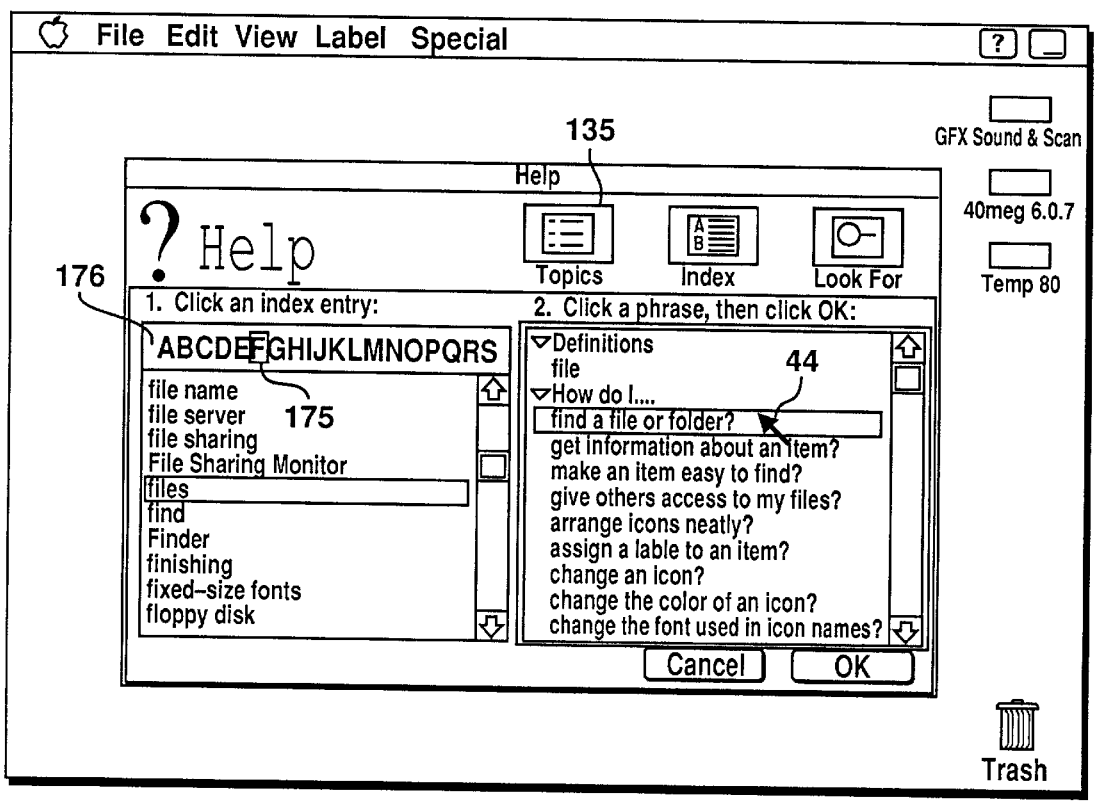
FIG. 11 illustrates the window of FIG. 10 once the selection "How do I find a file or folder?" has been selected.

The user places the cursor 44 over a portion of a desired letter (See FIG. 9) and momentarily clicks the switch 46 on the mouse 42. Upon sensing the letter selection, the CPU 52 displays the nearest and all subsequent entries beginning with the selected letter. In the example of FIG. 9, the user has selected the letter "F". Upon sensing the selection, the CPU 52 displays index entries beginning with the letter "F". In the event that there is insufficient display space to display all of the entries beginning with the letter "F", the user may use a scroll bar 178 to scroll the data disposed within the index screen vertically. Alternatively, a user may position the slider 175 over a desired letter by placing the cursor 44 over a portion of the slider 175, depressing the switch 46 on the mouse 42, and dragging the cursor and slider across the alpha scroll bar 176 to a desired letter. Upon reaching the desired letter (in FIG. 9 "F"), the user releases the switch 46 on the mouse 42. Once selected, the list of entries is displayed beginning with entries having the selected letter. As shown in FIG. 10, the placement of the cursor 44 over an entry such as "Files" and the momentary clicking of the switch 46 on the mouse 42, results in the display of a list of questions as previously described with reference to FIGS. 5 and 6. As in the example of the topics button previously discussed, as shown in FIG. 11, the user then selects a question (for example, "How do I find a file or folder?") and momentarily clicks the mouse button 46. As illustrated in FIG. 7, the presentation window 165 is then displayed and operates as previously described.

Figure 12:
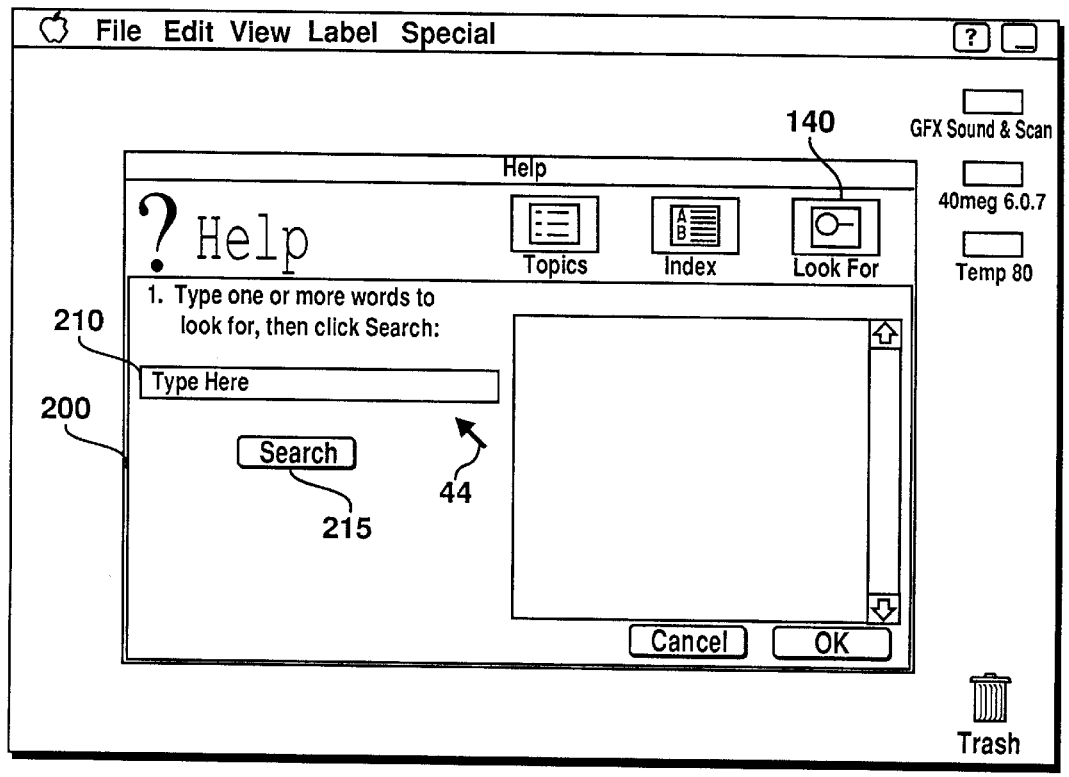
FIG. 12 illustrates the access window of the present invention having the "Look for" screen selected.

Referring now to FIG. 12, the placement of the cursor 44 over the "Look For" button function 140, and the momentary activation of the switch 46 on mouse 42, results in the generation and display of a look for screen identified generally by the numeral 200. The look for screen 200 permits users to type phrases in a text box 210 and view questions related to the phrase (if any). As in the previous examples with respect to the index and topics buttons, when the look for button 140 has been selected, the button appears inverted, thereby indicating it is currently active.

Figure 13:
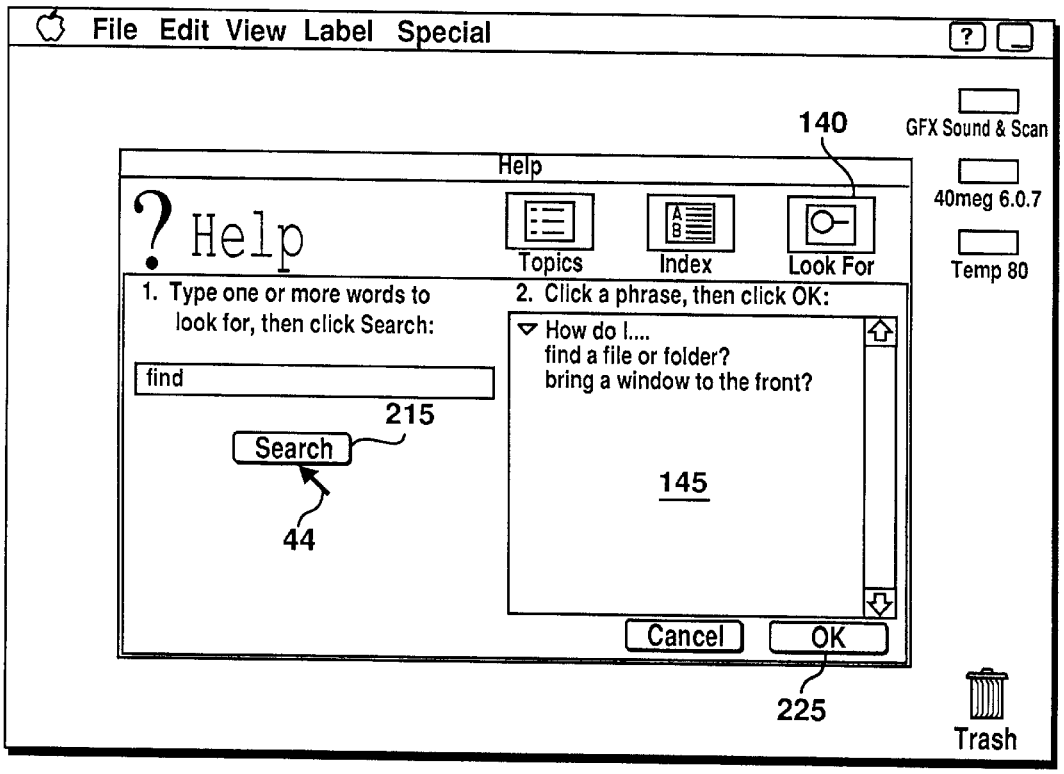
FIG. 13 illustrates the access screen of FIG. 12 after the word "Find" has been inputted and searched.
Figure 14:
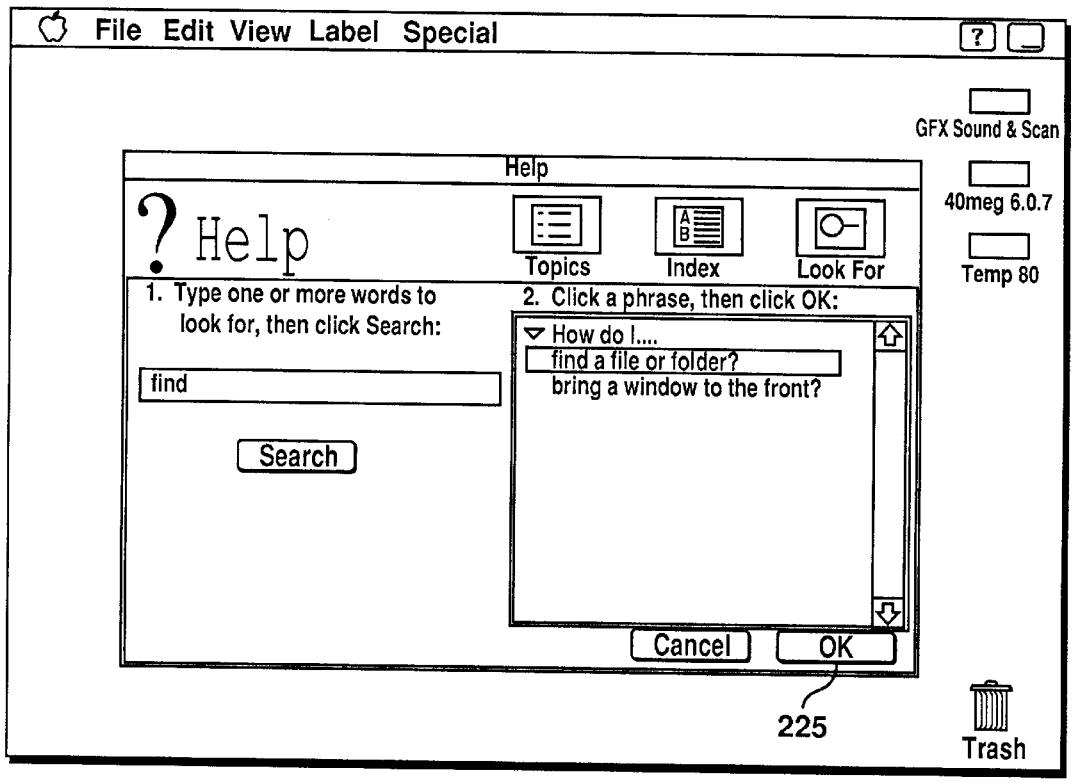
FIG. 14 illustrates the access screen of FIG. 13 in the selection of "How do I find a file or folder?" being selected.
Figure 15:
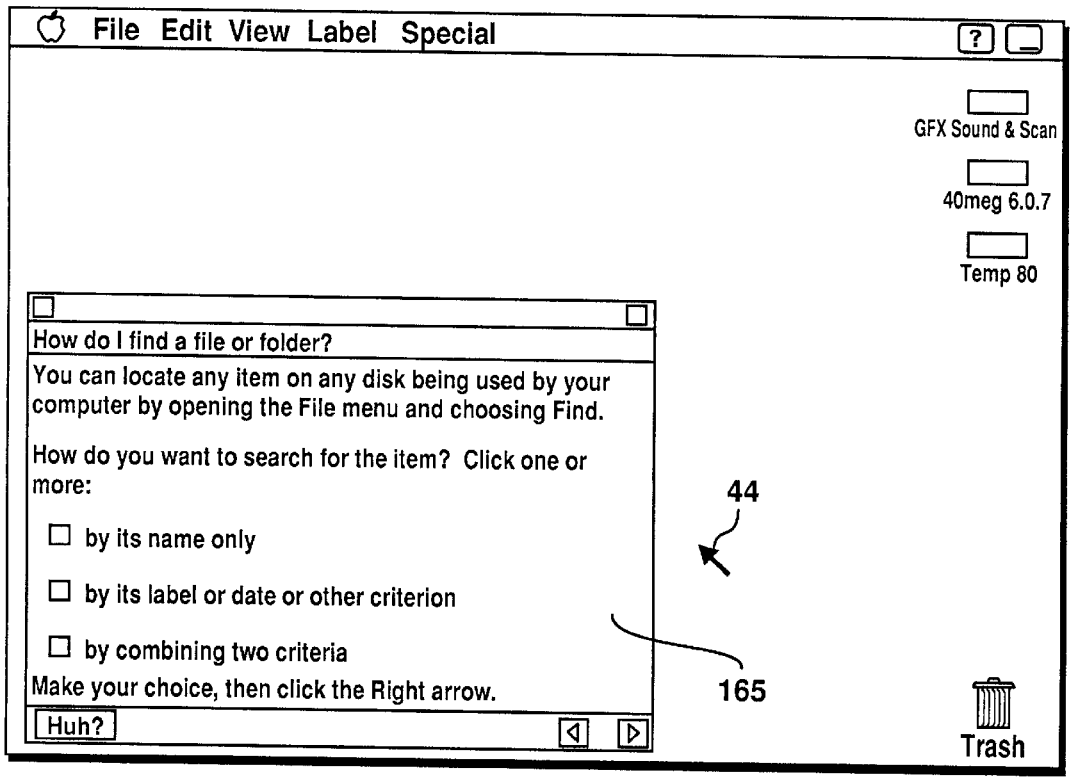
FIG. 15 illustrates a presentation window entitled "How do I find a file or folder?" displayed subsequent to the selection illustrated in FIG. 14.

As illustrated in FIG. 13, the look for screen 200 also includes a search button function 215. In operation, the user utilizing the keyboard 56, types into the text box 210 a search word (in the example of FIG. 13, the word "find"). The user then places the cursor over the search button function 215 and momentarily clicks switch 46. Upon the selection of the search button 215, the CPU 52 searches the help data base stored in memory 55, mass memory 60 or CD ROM 62 and displays the list of questions corresponding to the search term within the working area 145, as previously described with reference to FIGS. 3 through 11. As illustrated in FIG. 14, to select a desired question (such as "How do I find a file or folder?"), the user places cursor 44 over the question and momentarily clicks switch 46. To initiate the selected help function, the user then places the cursor 44 over the "OK" button function 225 and once again clicks switch 46. Upon sensing the selection of the help inquiry, the CPU 52 then generates and displays the presentation window 165, as previously described with reference to FIGS. 7 and 11. The user then may further define the help request by selecting one of the three (as shown in the example of FIG. 15) criteria displayed in the presentation window 165.

Accordingly, as described in this Specification, the present invention provides three access methods for obtaining desired help information from the computer system 48. A user may select the topics button function 135, the index button function 138, or the look for button function 140. Using one of the three select button functions, an appropriate access window and presentation window is displayed to assist the user in obtaining the desired information necessary to operate the computer system illustrated in FIG. 1. Described more fully below, the present invention provides additional features which distinguish it from prior help based systems and graphic user interface designs.

Alpha Scroll Bar

Figure 16:
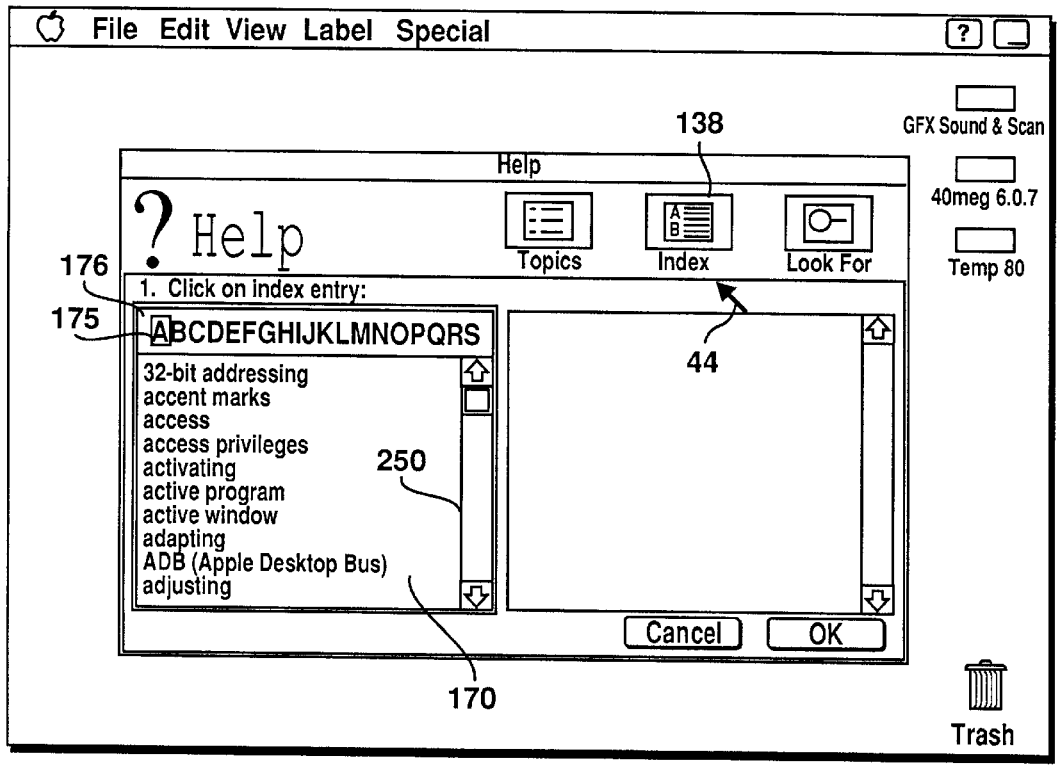
FIG. 16 illustrates the access window of the present invention after index has been selected, and the alpha slider.

As previously described with respect to FIGS. 8 through 11, the selection of the index button function 138 results in the display of index 170 and an alpha scroll bar 176. As illustrated in FIGS. 8 and 16, the alpha scroll bar 176 includes a slider 175. The index 170 further includes a vertical scroll bar 250. As shown in FIG. 16, the alpha scroll bar 176 includes a plurality of letters A through S, which are displayed upon the selection of the index button function 138. Although FIG. 16 illustrates letters A through S being displayed on the alpha scroll bar 176, it will be appreciated by one skilled in the art that the selection of letters is a matter of design choice. For example, it is possible to replace the letters disposed on the alpha scroll bar 176 with other characters, symbols, or non-English language characters, as desired for the particular application and language system used by the user.

Figure 17:
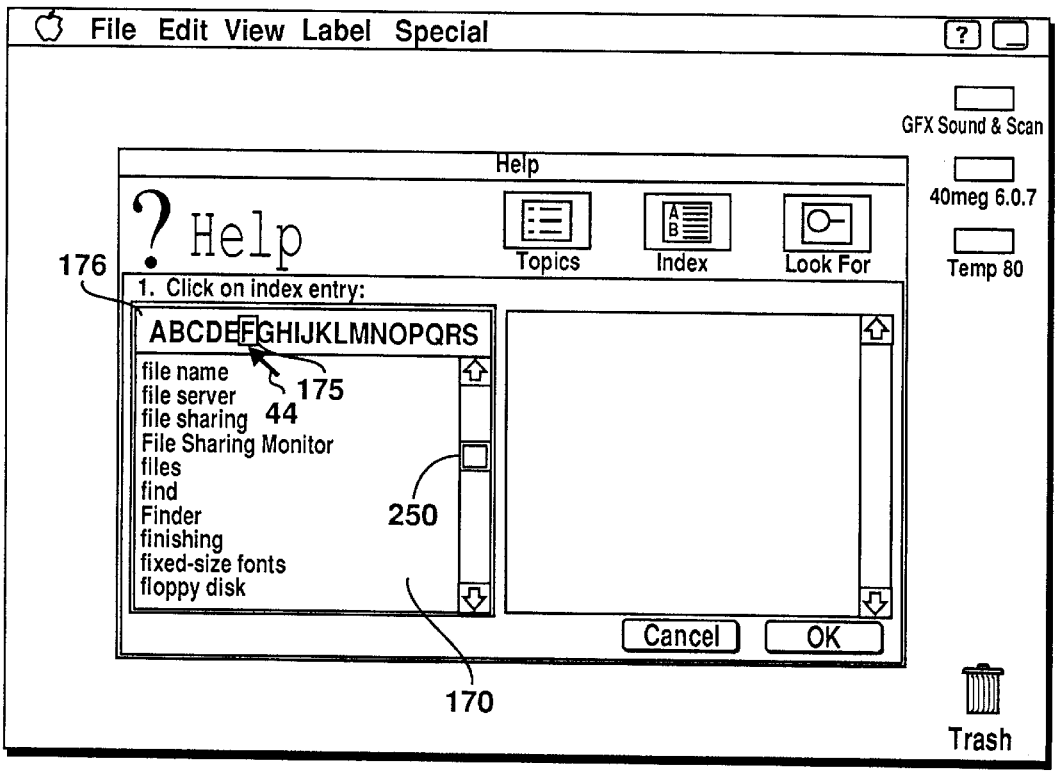
FIG. 17 illustrates the window of FIG. 16 once the letter "F" has been selected.
Figure 18:
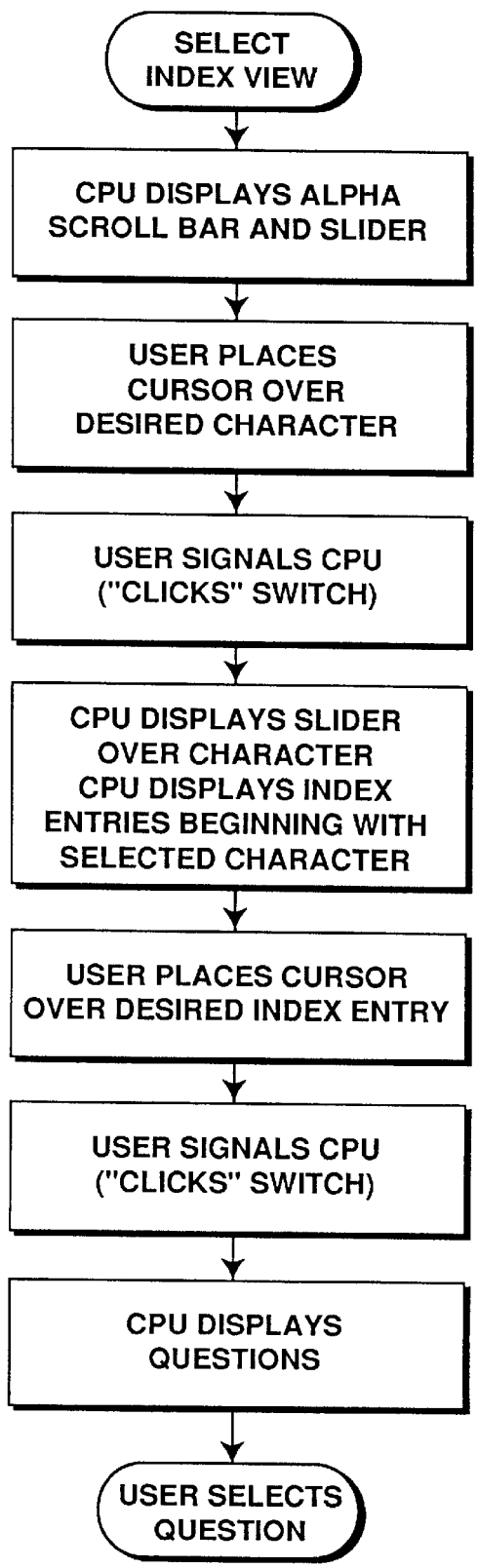
FIG. 18 is a flow chart illustrating a selection technique of the present invention.
Figure 19A:
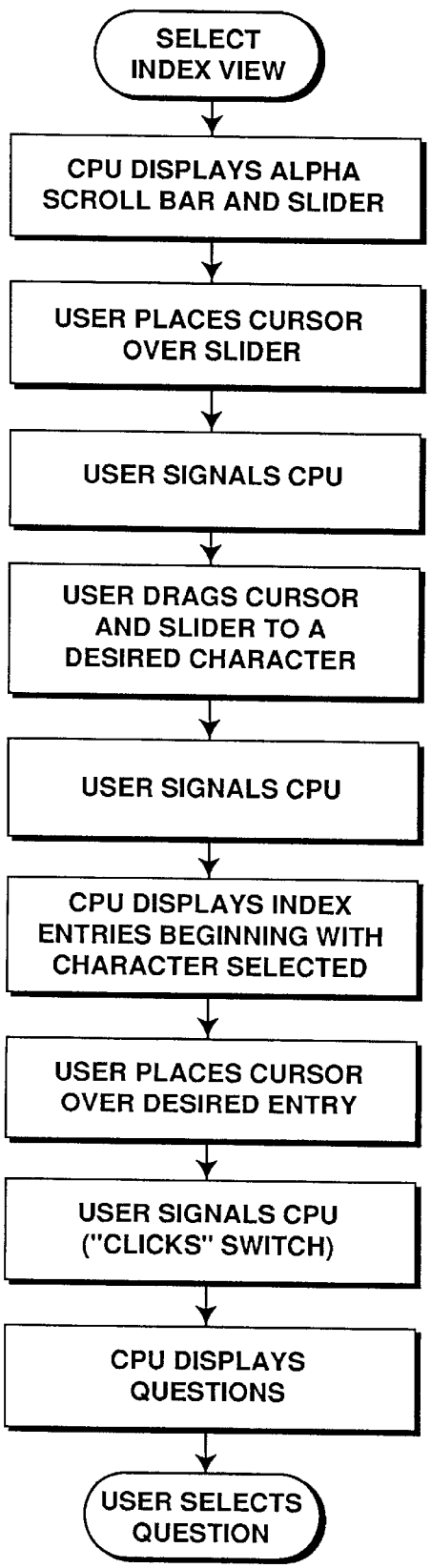
FIGS. 19a, 19b, 19c and 19d are flow charts illustrating alternate selection techniques of the present invention.

As shown in FIG. 17 and the flow chart of FIG. 18, a user may select a desired letter (in the example of FIG. 17, the letter "F") by placing the cursor 44 over, or adjacent to, the letter ("F") and momentarily clicking switch 46. Alternatively, as illustrated in the flow chart of FIG. 19(a), a letter may be selected by placing cursor 44 over a portion of slider 175, depressing switch 46 and dragging the cursor and slider over the desired letter, at which point the user releases switch 46.

Figure 19B:
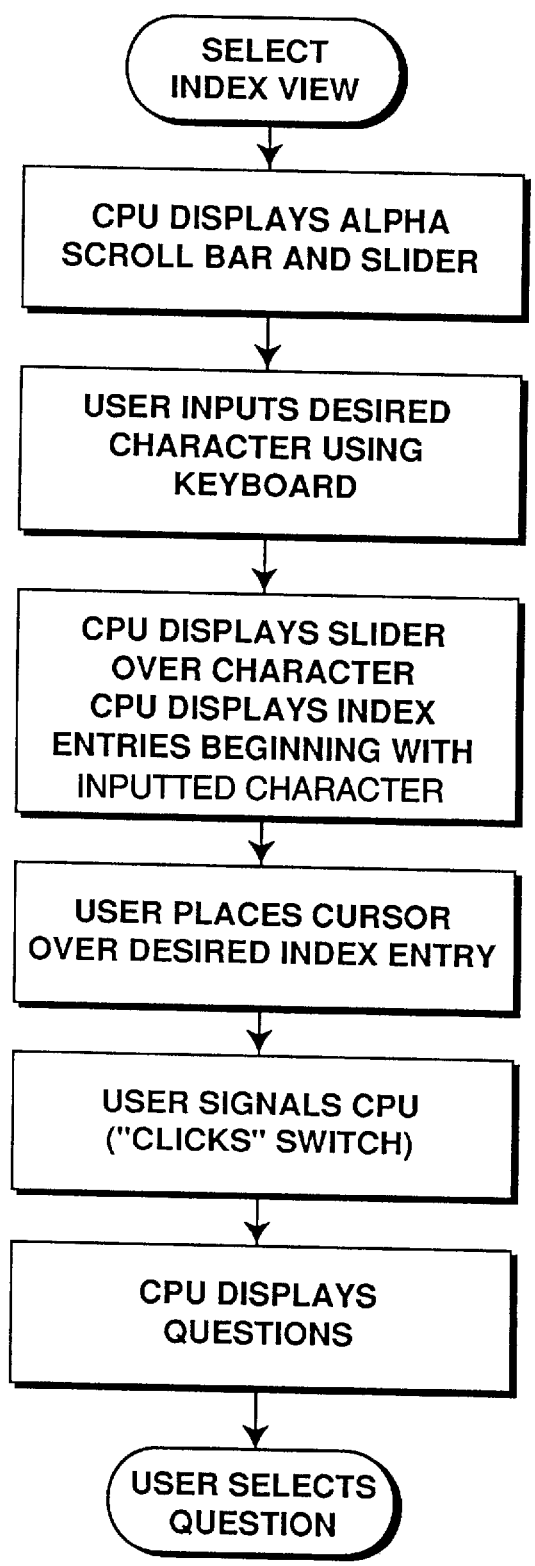
Figure 19C:
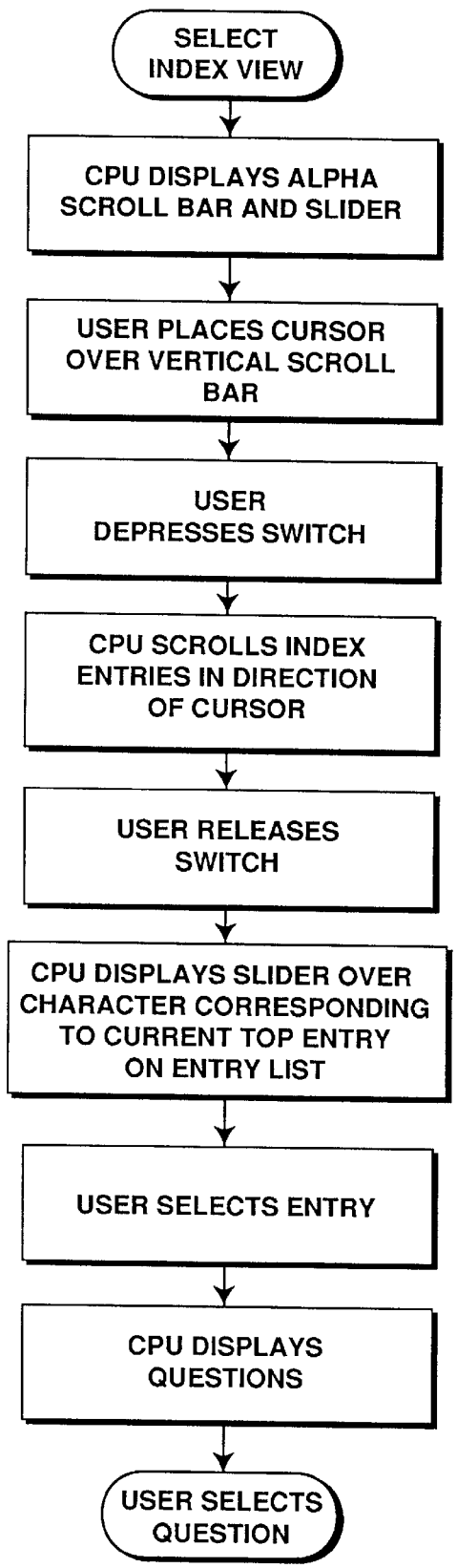

A selection may also be made by the user depressing a desired character key on the keyboard 56 of FIG. 1. Upon sensing the keyboard character input, CPU 52 displays the slider 175 over the corresponding character on the alpha scroll bar 176 (see FIG. 19(b)). Additionally, the slider 175 may also be moved on the alpha scroll bar 176 by placing the cursor 44 over vertical scroll bar 250 and depressing switch 46. Upon sensing the placement of the cursor 44 over scroll bar 250 and the depression of the switch 46, the CPU 52 scrolls through the listing of entries in a direction toward the cursor 44 until the switch 46 is released by the user. Once the switch 46 is released, the CPU 52 displays the slider 175 over the character representing the current entry at the top of the entry list (see FIG. 19(c)).

Figure 19D:
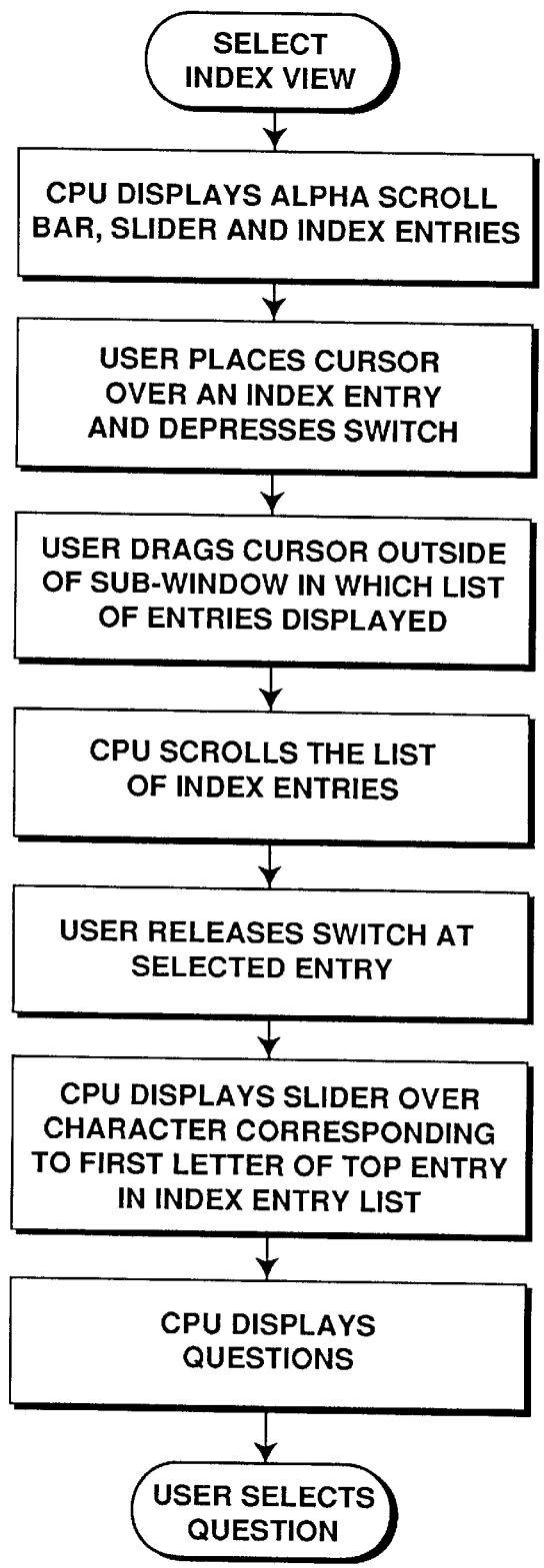

Moreover, the slider may also be moved using the method illustrated in flow chart form in FIG. 19d. After the user has initially chosen the index button function 138, subsequent selections of the index function 138 results in the CPU 52 displaying the index 170 with index entries. An alternate method of scrolling the index entries is for the user to place cursor 44 over an index entry and depress switch 46. By dragging the cursor 44 vertically outside of the sub-window in which index 170 is displayed (either up or down), and continuing to depress switch 46, CPU 52 scrolls the index entries in a direction away from the cursor 44. In the present embodiment, an index entry is highlighted in black (or other distinctive color) as the entries are scrolled. Releasing switch 46 once the desired entry is highlighted, results in the entry's selection, and the display of the slider 175 over the character corresponding to the first letter of the top most entry in the index entry list currently displayed.

In the presently preferred embodiment, the CPU 52 moves the slider 175 in a snap fashion from one character position to another (See video tape entitled "Reno" submitted concurrent with the application on which this patent is based). However, it is contemplated that the movement of the slider 175 may be rendered by the CPU 52 as a continuous movement with a snapping movement at the selected character.

Figure 20:
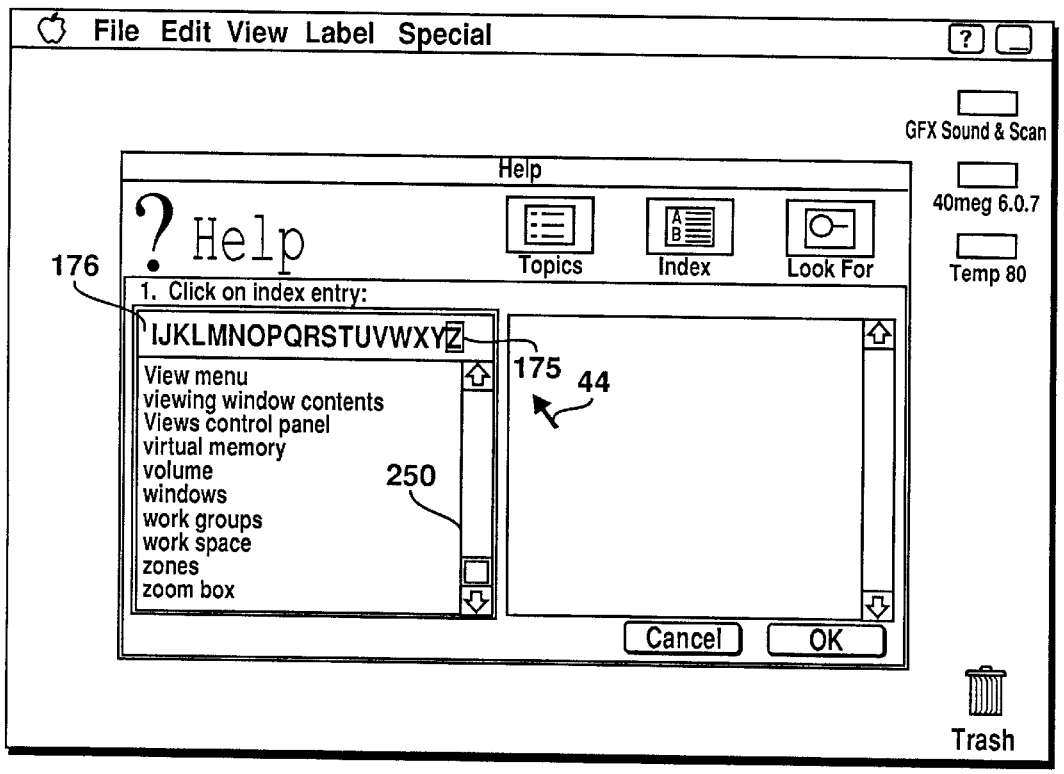
FIG. 20 illustrates the position of the alpha slider of the present invention and alpha scroll bar when the slider is moved from the letter "F" to the letter "Z".
Figure 22:
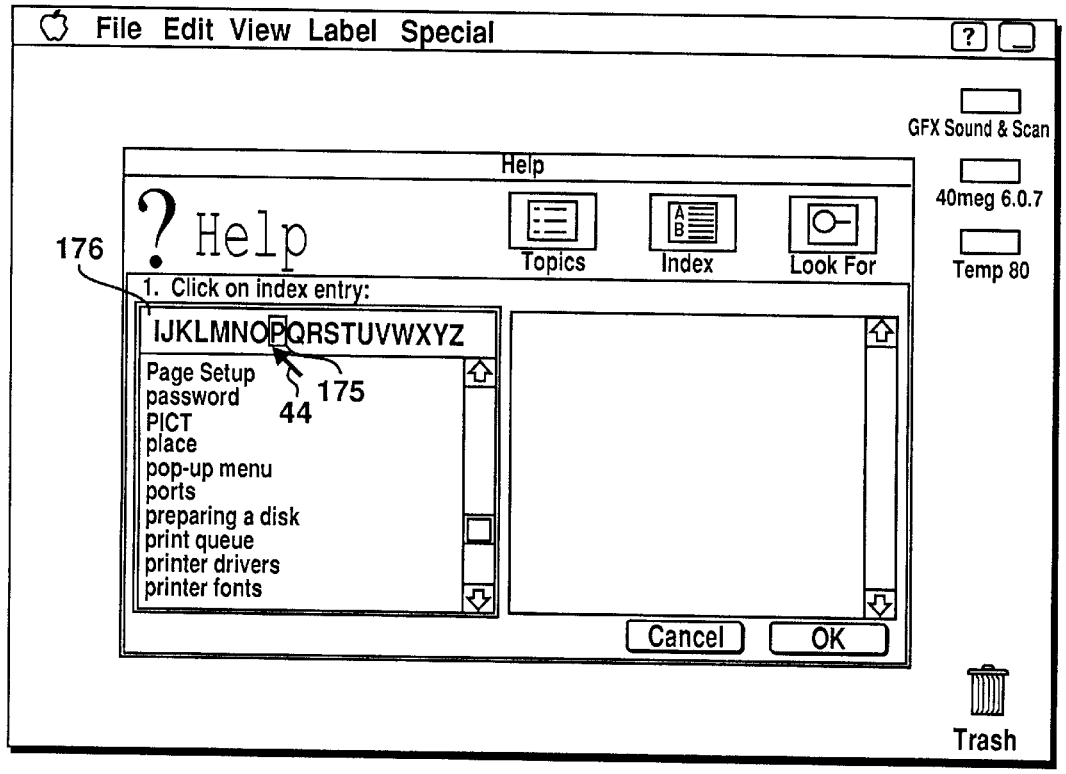
FIG. 22 illustrates the position of the alpha slider after it has been moved from the letter "Z" to the letter "P".
Figure 21:
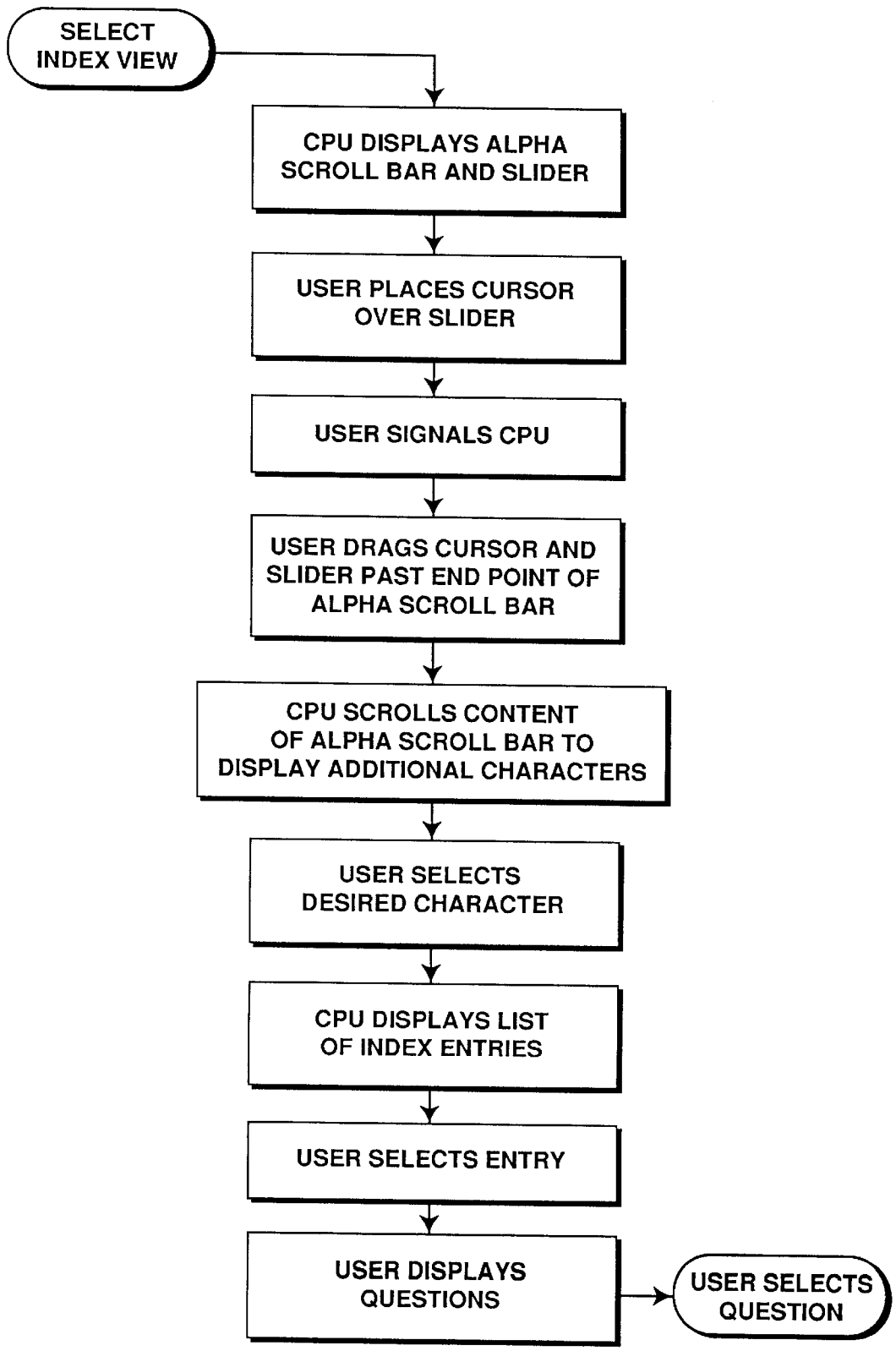
FIG. 21 is a flow chart illustrating the scrolling feature of the present invention's alpha scroll bar.

As shown in the figures, upon selection of a letter (character), the CPU 52 displays index entries beginning with the selected letter. Additionally, in the event that there is insufficient space to display all of the index letters (in the example A through Z), then the user may scroll the alpha scroll bar 176 to display additional letters, symbols or other characters. Referring now to FIGS. 20 and 21, the selection of the letter "Z" is shown. In operation, a user desiring to select the letter "Z" (or other originally non-displayed letters) places the cursor 44 over a portion of the slider 175. The user then depresses switch 46 and drags the cursor 44 and slider 175 the end point of the alpha scroll bar 176 (in the present example the letter "S"). While continuing to depress switch 46, the user continues to move the cursor 44 and slider 175 beyond the last displayed symbol (the letter "S"). Upon sensing the attempted movement of the slider 175 and cursor 102 beyond the last displayed symbol or character on the alpha scroll bar 176, the CPU 52 scrolls the content of the alpha scroll bar 176. For example, as shown in FIG. 20, if the slider 175 is placed over the letter "S" and the user continues to attempt to move the slider 175 to the right, CPU 52 senses the attempted movement and scrolls the slide bar 176 to the left, thereby rendering T through Z visible. Similarly, if a user places the slider 175 over the letter "I" and attempts to move the slider 175 further to the left, the CPU 52 scrolls the alpha scroll bar 176 to the right, thereby once again rendering the letters A through H visible. FIG. 22 illustrates the subsequent positioning of the slider 175 over the letter "P" wherein the content of the index is altered by CPU 52 to display the nearest and all subsequent entries beginning with the selected letter "P", but not further scrolling the slide bar 176, since the letter "P" was already visible.

In addition, it is contemplated that in certain applications, it may be desirable for the alpha scroll bar 176 to scroll in a continuous loop fashion. In the example of FIGS. 20 and 21, the use of continuous scrolling would result in the scroll bar 176 scrolling from letter "Z" back to letter "A", and subsequent letters. In non-English based character systems, such as Japanese, Chinese or Thai, where the alphabet includes significantly more letters/characters than English, the continuous looping of the scroll bar 176 may be desirable.

Figure 23:
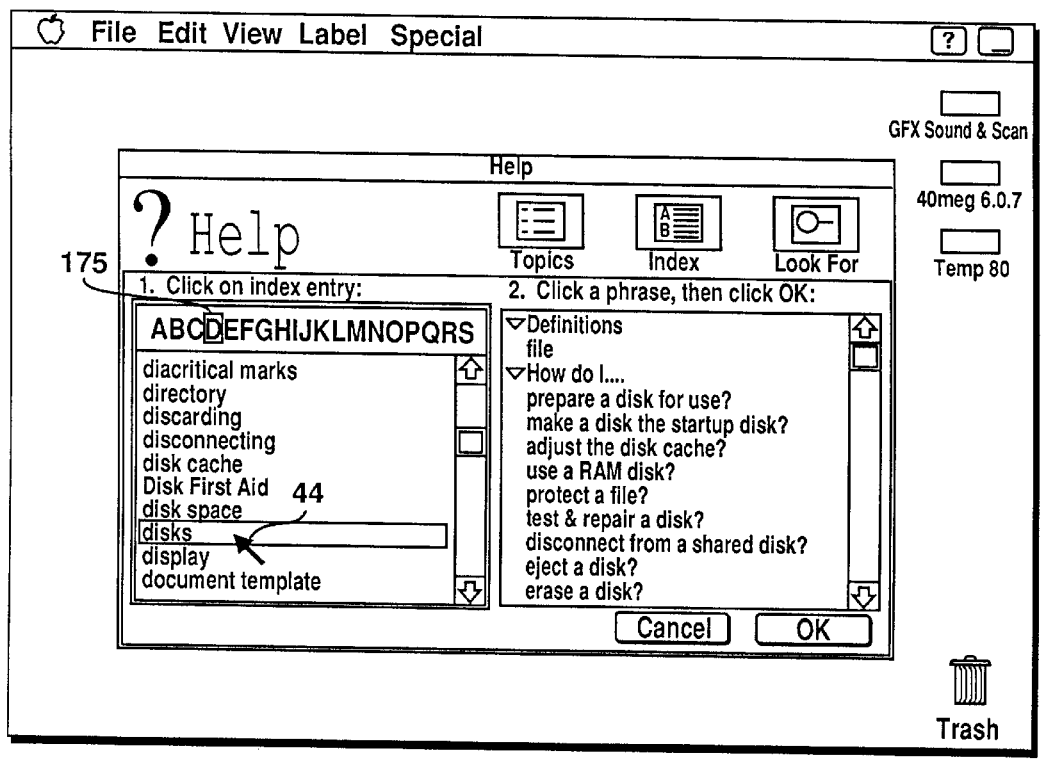
FIG. 23 illustrates the position of the scroll bar when the slider moves from the letter "P" to the letter "Z" and the selection of the word "disks".
Figure 24:
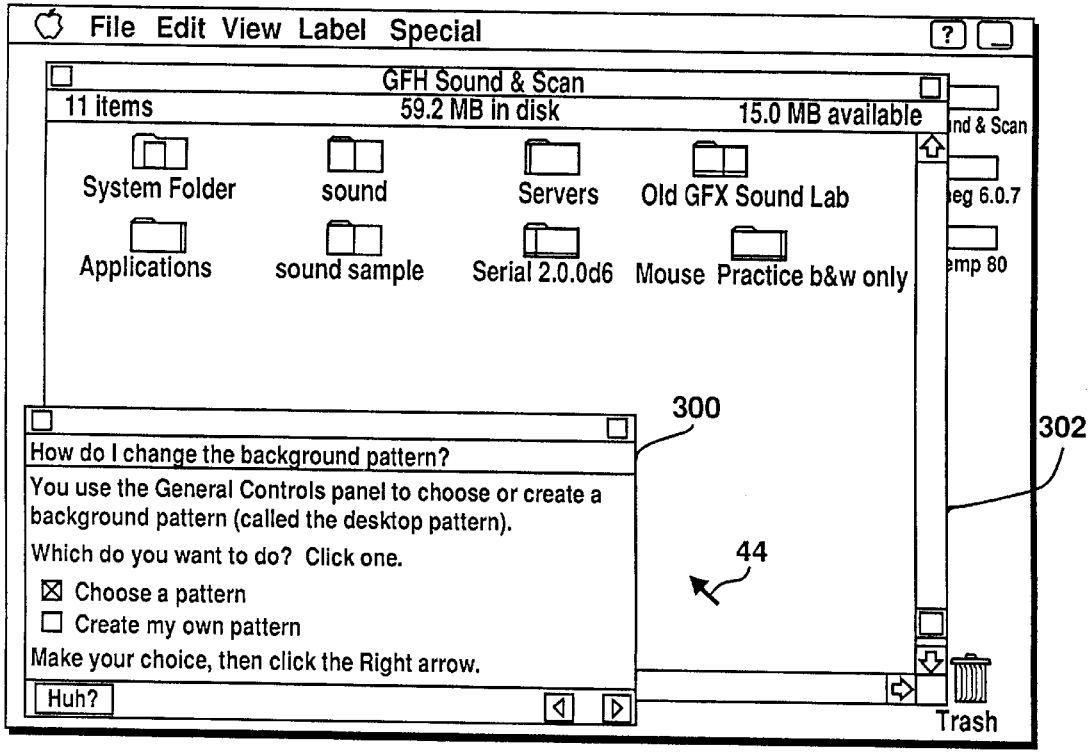
FIG. 24 illustrates the presentation window of the present invention disposed on top of a window entitled "GFX Sound & Scan".

As illustrated in FIG. 23, once the alpha slider is placed over a letter (in the example of FIG. 23, the letter "D") using one of the above described methods, entries beginning with the letter D are displayed. Also shown in FIG. 21 is the cursor 44 placed by the user over the entry "disks" which after the momentary depression of switch 46 results in the display of the questions relating to the selected entry. Upon selecting the desired question, the cursor 44 is then placed over the OK button function and switch 46 clicked, or alternatively, the cursor 44 may be placed over the desired question and the switch 46 double clicked. As illustrated in FIG. 24, clicking the OK button of FIG. 23, or double clicking with the cursor 44 displayed over the desired question, results in the generation of a presentation window 300, which the user may operate upon to obtain the desired help information.

Floating Windows

Referring again to FIG. 24, the presentation window 300 is illustrated which overlays a window 302 entitled "GFX Sound and Scan". The presentation window 300 appears to the user to "float" above the underlying window 302. An important distinction of the present invention over prior windowing systems is that the help windows comprising the presentation window 300, and access window 130, are displayed independent of the other window applications currently displayed. In the example of FIG. 24, window 302 remains an "active" window, and a user may operate upon the data disposed within the various folders illustrated even though the access window 300 is displayed as the "top" window. A user may select a folder such as the "System Folder" in window 302 while the presentation window 300 is displayed over window 302, as shown. Alternatively, a user may obtain help information using the presentation window 300 by selecting an option such as "Choose a pattern" shown in the figure.

In prior systems, the selection of a window, thereby rendering the selected window active, results in the active window being displayed over underlying windows, wherein the user may only operate upon the currently active window. Using the teachings of the present invention, the presentation window 300 or access window 130 "floats" above other application windows, such as window 302, and are simultaneously active, thereby allowing the user to operate on both windows 302 and 300 without altering the ordering of the window layers.

Figure 25:
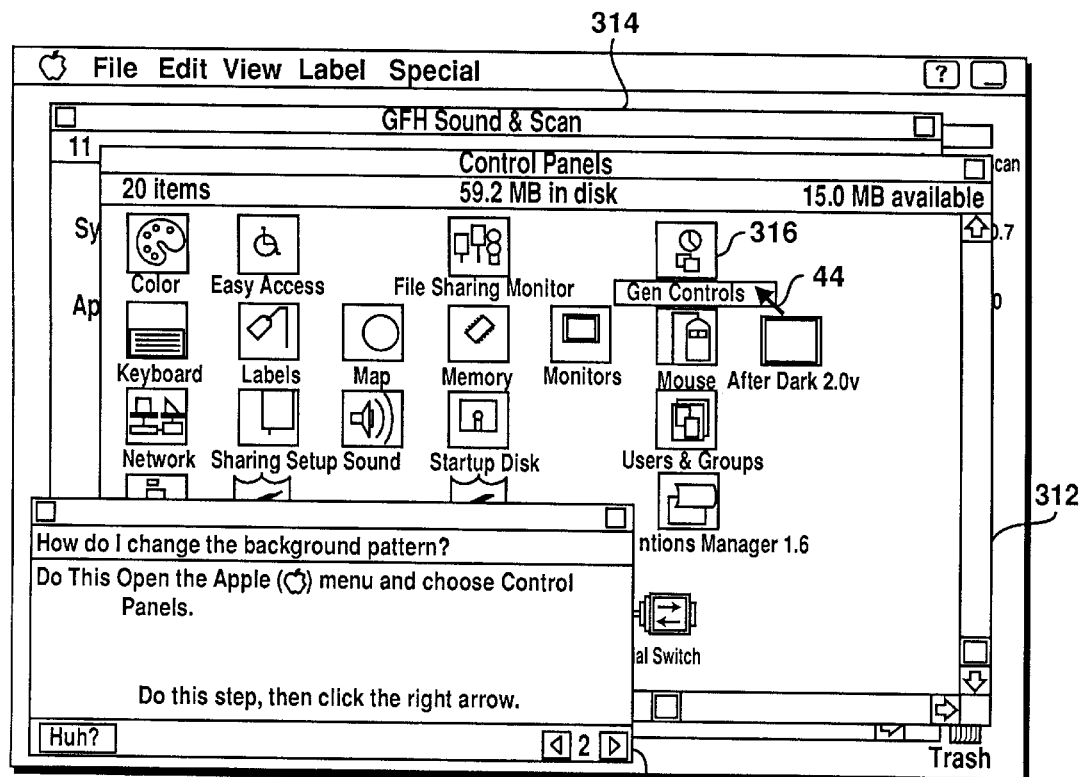
FIG. 25 illustrates the presentation window disposed above her layered windows in the display of the present invention wherein the "Control Panels" windows is active.

Referring now to FIG. 25, another example of the present invention's floating windows attribute is illustrated. As shown, a presentation window 310 overlays a window 312 entitled "Control Panels". Window 312 in turn overlays a window 314 entitled "GFX Sound and Scan". In the example illustrated in FIG. 25, presentation window 310 is active, and the user may follow the instructions within the window 310 on how to change the background pattern of the display screen 68. In addition, the control panel's window 312 is also simultaneously active, and a user may operate on the various functions represented by icons within the window 312. Thus, the present invention's floating windows permit two windows to be active and operable upon by a user simultaneously. As is the case in prior window-based systems, the underlying GFX Sound and Scan window (314) is inactive. To render the underlying window 314 active, the user would place cursor 44 over some portion of window 314, and momentarily click switch 46.

Figure 26:
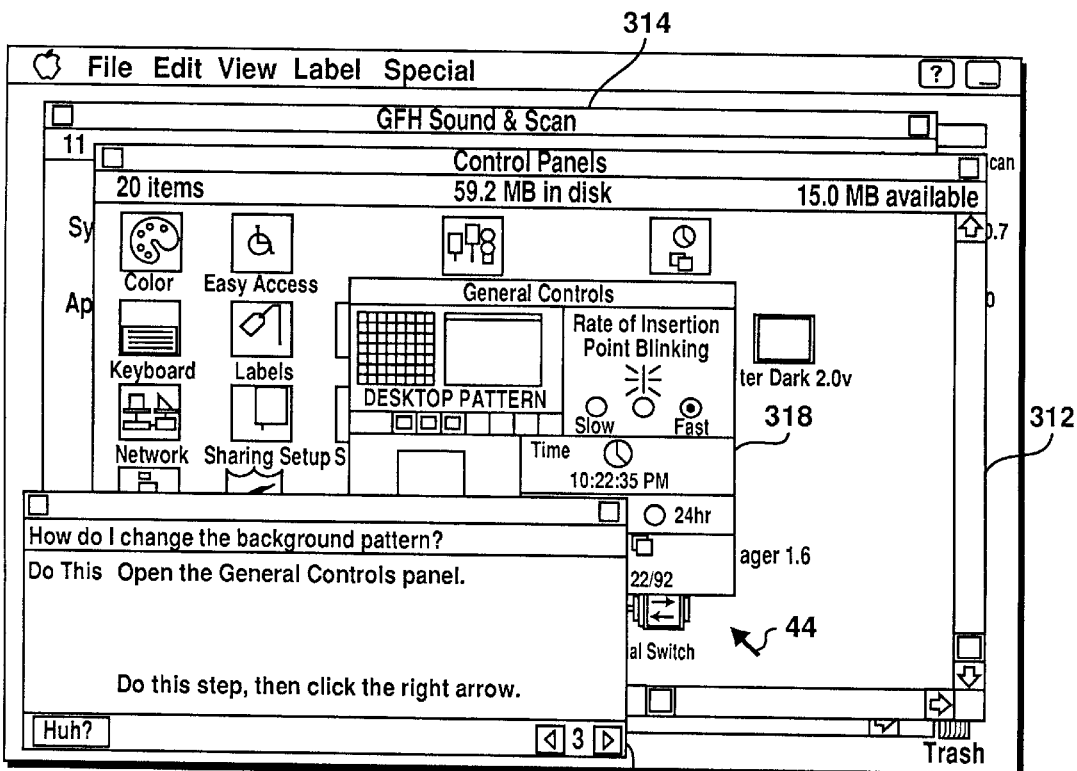
FIG. 26 illustrates the presentation window of the present invention disposed on top of three windows wherein the window entitled "General Controls" is active.

Assume for sake of example that the user places the cursor 44 over a portion of the general control icon 316 illustrated in FIG. 25. The general control icon function may be activated by then momentarily clicking switch 46, as is well known. Referring now to FIG. 26, the clicking of switch 46 after placing cursor 44 over icon 316 results in the CPU 52 generating and displaying a general controls window 318 which overlies the control panels window 312. The opening of the general controls window 318 results in the general controls window being rendered active, and the underlying windows, namely, the control panels window 312 and the GFX Sound and Scan window 314, rendered inactive. However, the opening or manipulation of underlying windows within applications, such as the control panels window 312 and the like, does not alter the active state of the presentation window 310. Both the general controls window 318 and the presentation window 310 are active and may be operated upon by the user. In addition, using the teachings of the present invention, the placement of the presentation window 310 in other areas on display screen 68 does not alter the function of either the presentation window 310, or underlying application windows.

Figure 27:
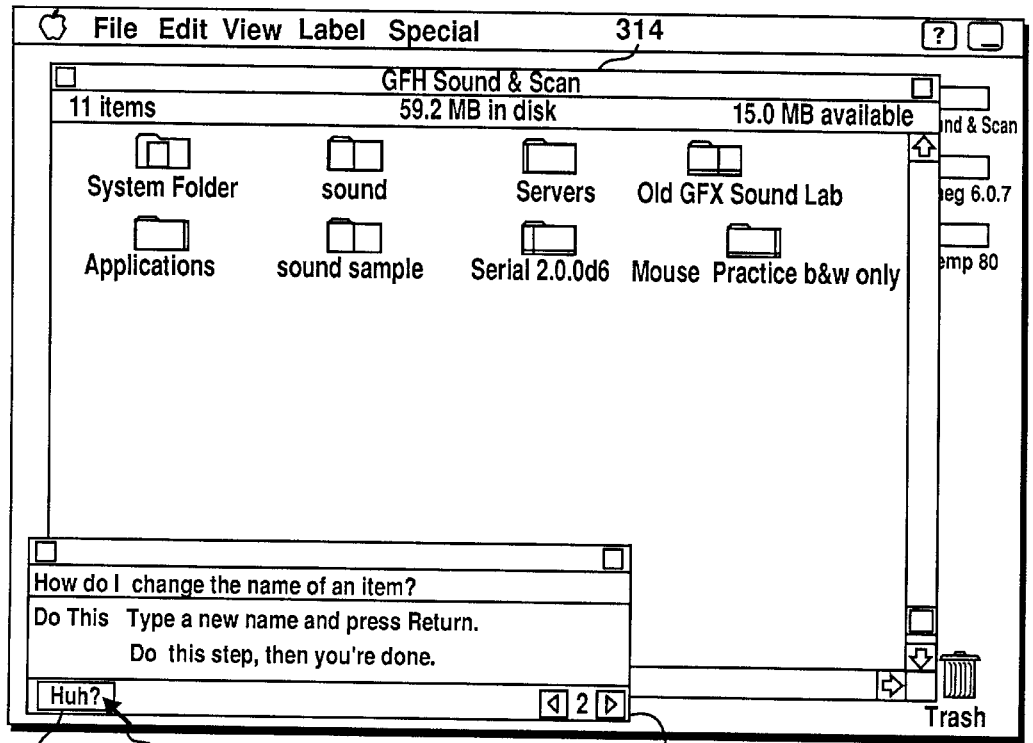
FIG. 27 illustrates the presentation window of the present invention disposed above an active window entitled "GFX Sound & Scan".
Figure 28:
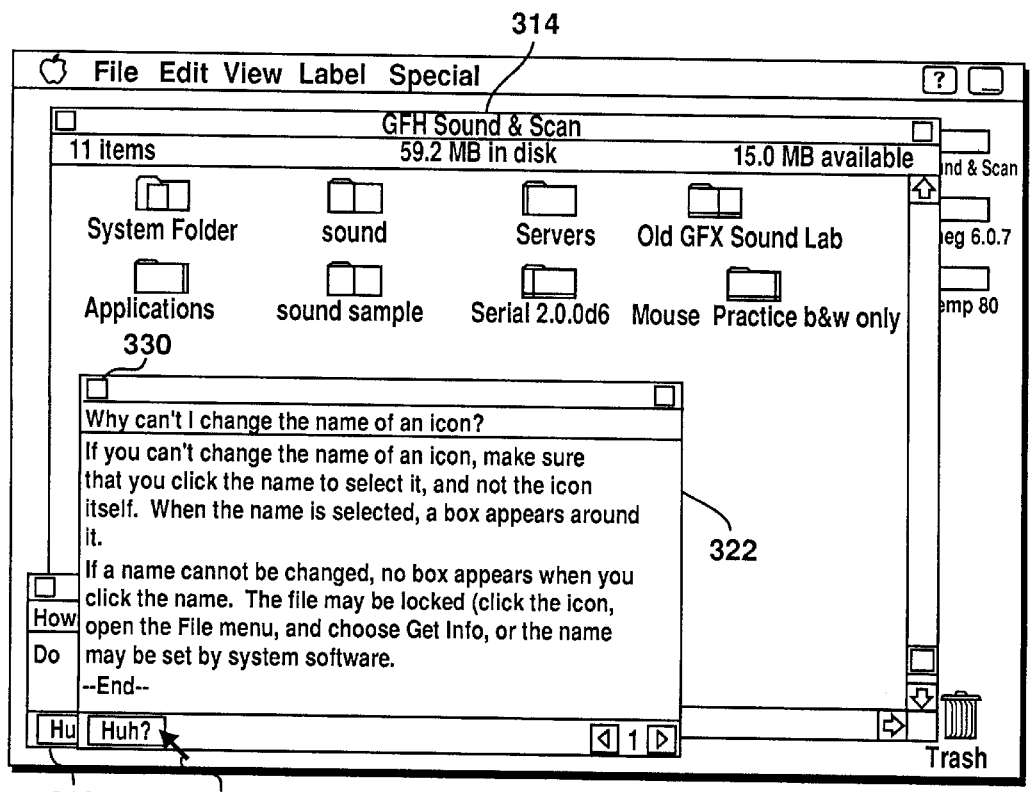
FIG. 28 illustrates the present invention's layering of the presentation window. In the figure, the button entitled "HUH?" is selected and another window is opened, but wherein the "GFX Sound & Scan" window is still active.

Referring now to FIG. 27, there is shown the presentation window 310 overlying the GFX Sound and Scan window 314. As illustrated in this figure, both the presentation window 310 and the GFX Sound and Scan window 314 are active. As previously described, the present invention's floating window attribute as applied to the presentation window 310, permits applications in underlying windows to be operated upon independent of the operation of the presentation window 310. As shown, the presentation window 310 includes a button function entitled "HUH?" 320. By placing the cursor 44 over a portion of the button function 320 and momentarily clicking switch 46, the CPU 52 generates and displays a window 322 which overlays both presentation window 310 and the GFX Sound and Scan window 314. As illustrated in FIG. 28, window 322 is active and the presentation window 310 is rendered inactive. The window 314 remains active such that the user may operate upon data and functions disposed within window 314 as well as operate on window 322. The present invention renders the presentation window 310 inactive so as not to confuse the user. The dismissal of window 322 by placing cursor 44 over a window closing mark 330 and momentarily clicking switch 46, results in the presentation window 310 being rendered active once again.

Coach Marks

Understanding names and identifying objects may be particularly confusing to end users in operating a computer system. Thus, as will be described, the present invention provides an additional feature which further assists users in operating the computer system illustrated in FIG. 1. A technique is disclosed for spotlighting objects on the display 68 which are referred to in the help presentation windows. The present invention provides "Coach Marks" which appear to be hand drawn, but are generated by the CPU 52, to coach the user through the requested help function. As will be appreciated, the coach marks draw the user's attention to objects displayed on display 68, and are effective in identifying objects even if the user has no prior knowledge of the object's name or function. The coach marks are visual, and as such, operate independent of the language of the user. Although the present invention is illustrated in FIGS. 29 through 35 as utilizing coach marks which are black and white, it will be appreciated by one skilled in the art that the coach marks may be rendered in color as well using a color display system.

Figure 29:
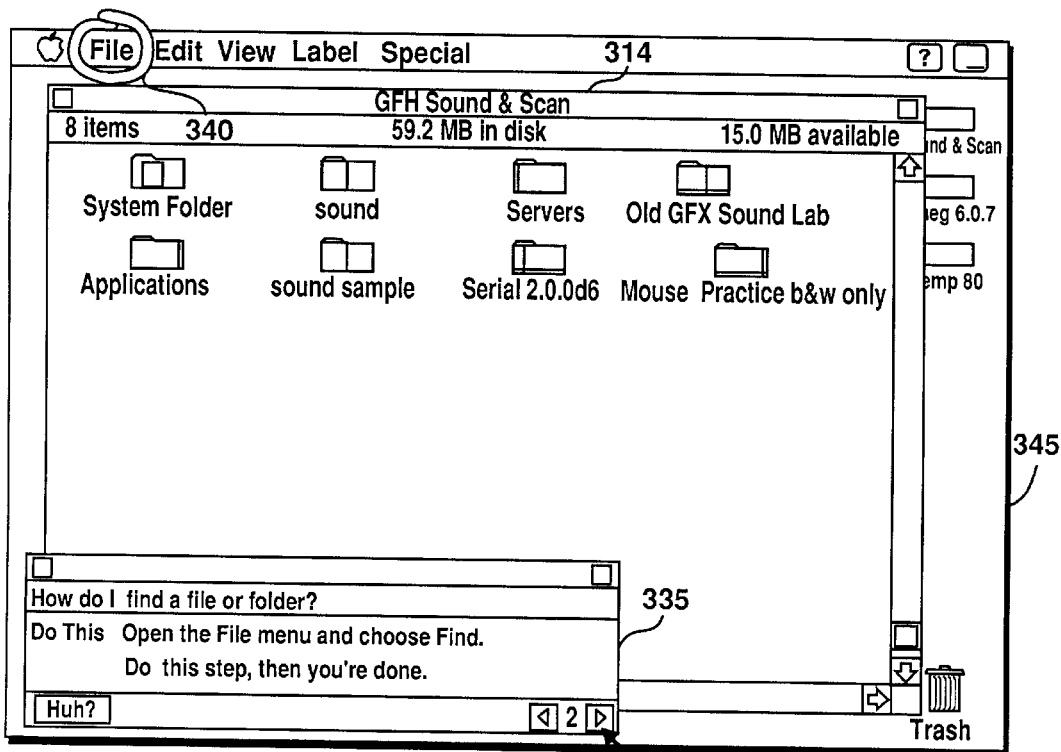
FIG. 29 illustrates the presentation window of the present invention in conjunction with a coach mark encircling the menu choice "File".

Referring now to FIG. 29, there is shown the GFX Sound and Scan window 314, as previously illustrated in prior figures. In addition, a presentation window 335 is illustrated overlaying the GFX Sound and Scan window 314. Also shown is a coach edit mark 340 which encircles the command option "file" on a menu bar 345. In operation, substantially simultaneously with the generation and display of the presentation window 335, the CPU 52 generates and displays the coach mark 340. In the presently preferred embodiment, the generation and display of the coach mark 340 appears to the user to be hand drawn with a hand marker, or the like. In addition, in the presently preferred embodiment, the coach mark 340 is rendered in a color which may be selected by the author of the data base, and the coach mark 340 is displayed by the CPU at a speed such that the rendering is intentionally slower than other CPU operations on the display and appears to the user as if animated. The purpose of the coach mark 340 is to identify and draw the user's attention to objects on display 68 which the user must choose or otherwise operate upon, to accomplish the desired help function accessed through the access window and presentation windows of the present invention described above.

Figure 30:
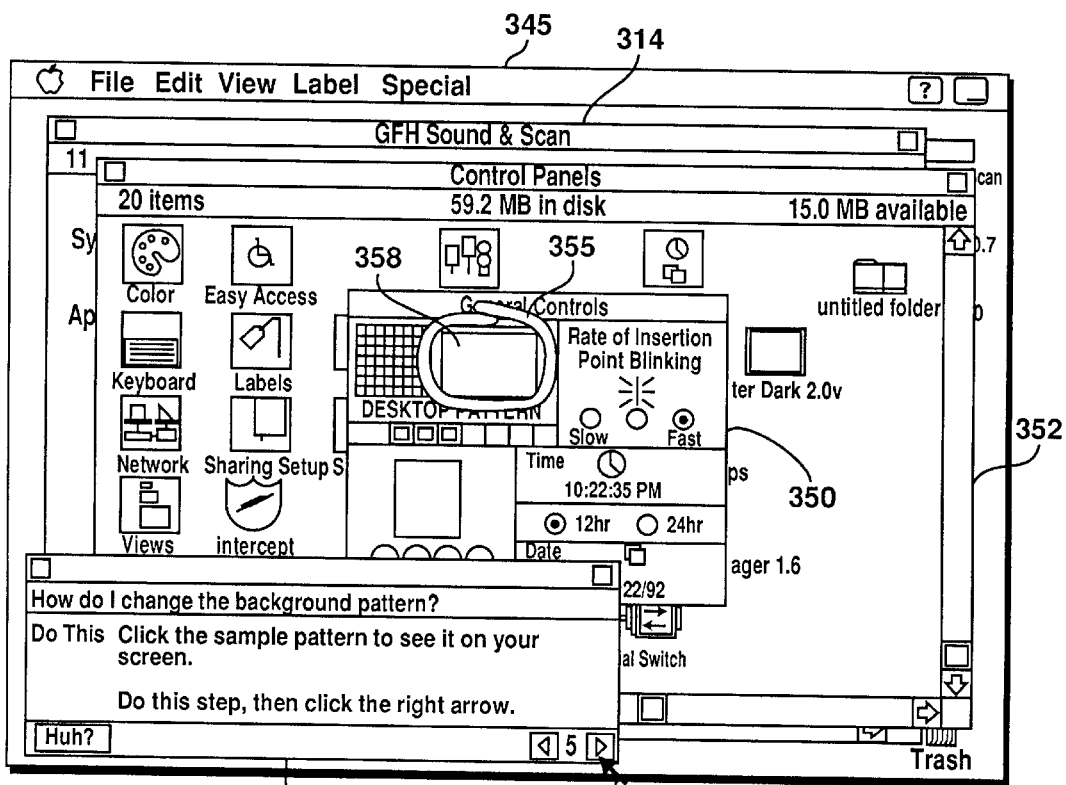
FIG. 30 illustrates the presentation window of the present invention disposed over an active window entitled "General Controls" in which a coach mark encircles a desktop pattern.

Referring now to FIG. 30, there is shown another example of the present invention's use of coach marks to assist the user. In the example, through the appropriate selection of a question in the access window (not shown), a presentation window 348 is displayed. An active window identified as general controls 350 is displayed overlaying the control panels window 352 and the GFX Sound and Scan window 314. To assist the user in accomplishing the desired help function which, in the present example, is phrased as "How do I Change the Background Pattern?", a circular coach mark 355 is provided by CPU 52. In the example illustrated in FIG. 30, the CPU 52, upon the generation and display of presentation window 348, also generates coach mark 355, and encircles the icon comprising a desktop pattern 358, as shown. The generation and display of the coach mark 355 draws the user's attention to the appropriate icon on the display 68 which the user must operate upon. It has been found that by providing coach marks which appear to be "hand drawn" by a human, the user is better able to visually identify the location of the display 68 on which he must act. Therefore, CPU 52, in the presently preferred embodiment, generates the coach marks of the present invention in a fashion which appears to the user as if a human was drawing on display 68 with a colored marker. As can be seen in FIG. 30, the coach mark 355 approximates a circle, and has the visual appearance as if a human drew the mark around the icon 358. The rendering of the coach mark 355 such that it only approximates a circle, as opposed to being a mathematically precise rendition of a circle, has been found to best catch the users attention since the coach mark 355 does not appear completely symmetrical as if drawn by a machine. In addition, the coach mark 355 is rendered on the actual interface as it is displayed by CPU 52, and not simply a representation of the interface stored in memory.

Figure 31:
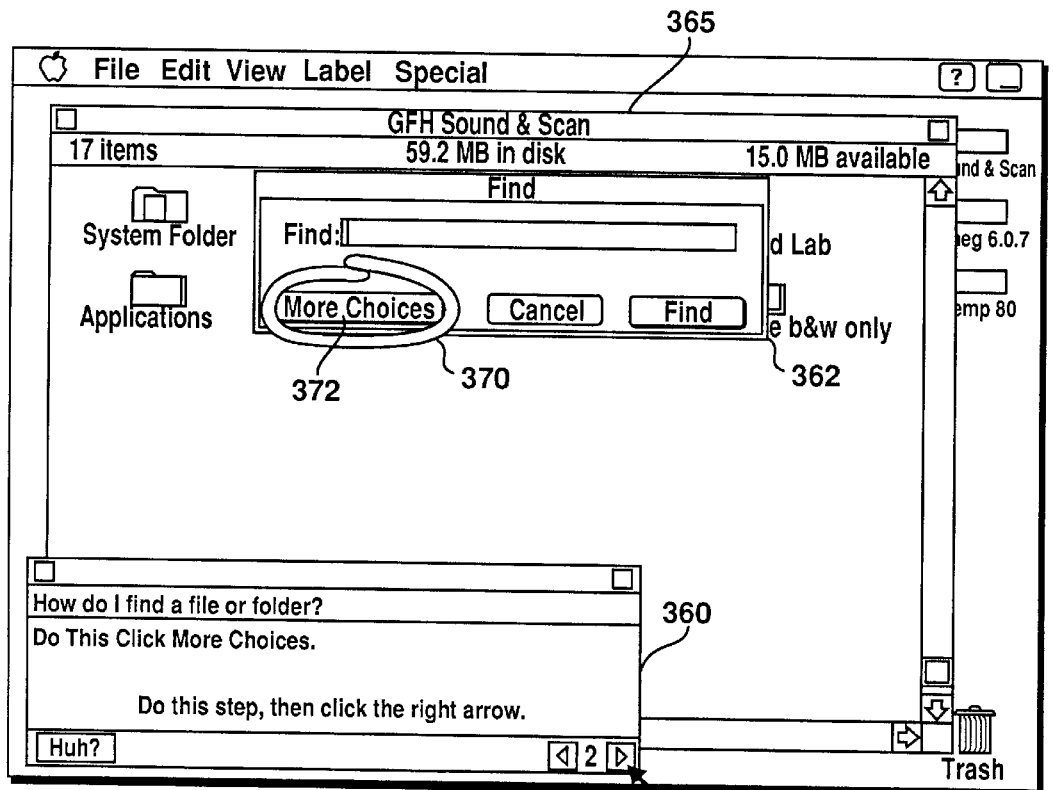
FIG. 31 illustrates the presentation window of the present invention and a coach mark encircling "More Choices" in a window entitled "Find".

Referring now to FIG. 31, another example of a circular coach mark is illustrated. As shown, a presentation window 360 is displayed on the display 68. A "Find" window 362 overlays a GFX Sound and Scan window 365. In the example, the presentation window 360 and the find window 362 are simultaneously active. The GFX Sound and Scan window 365 is currently inactive since it underlies the Find window 362. As in the example of FIGS. 29 and 30 upon generating the presentation window 360, the CPU 52 further generates a circular coach mark 370 which encircles a button function entitled "More Choices" 372, and displays the coach mark in a translucent color.

Figure 32:
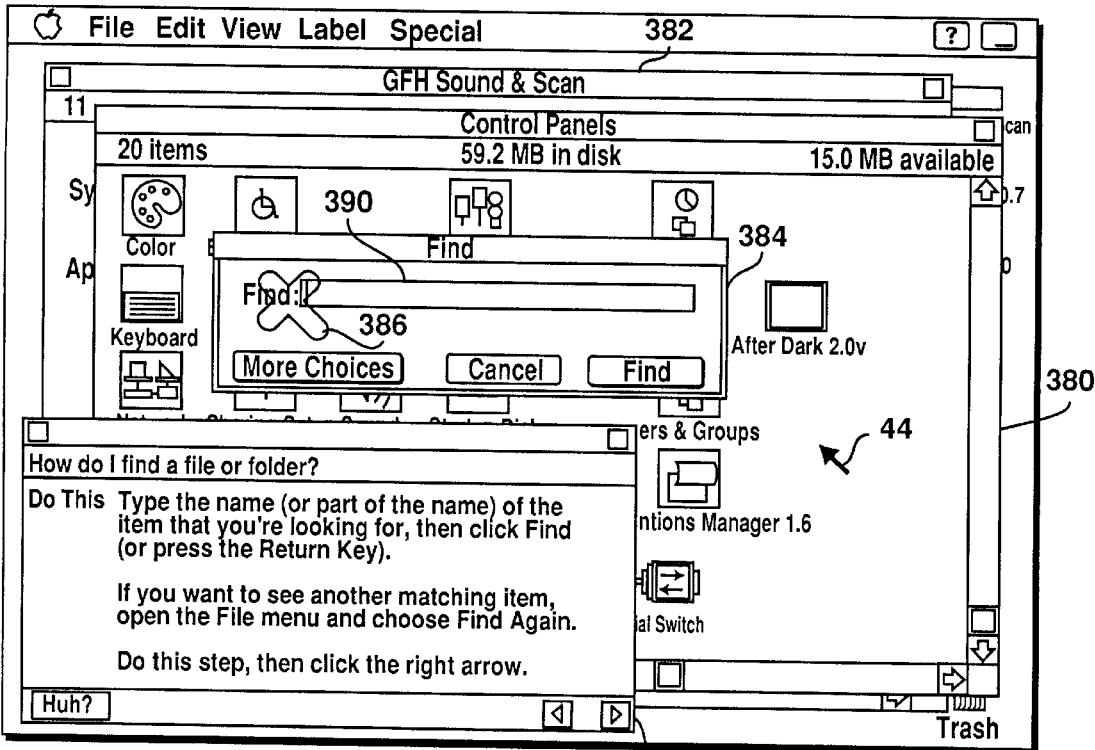
FIG. 32 illustrates the present invention's use of coach marks to identify an area which requires a user to insert data or make a selection.

Referring now to FIG. 32, therein is illustrated a presentation window 378 which overlays a control panels window 380 and a GFX Sound and Scan window 382. Also illustrated is a Find window 384 which overlays the control panels window 380, and is active. As such, the Find window 384 and the presentation window 378 are the currently active windows in the example. Also shown is a coach mark having the general shape of a "X" 386 which draws the user's attention to an area in the Find window 384 which requires the user to input data. The user must insert a search term in a "find" field 390 to obtain the necessary help information identified by the question "How Do I Find a File or Folder?" displayed in the presentation window 378. Thus, in the present example, the coach mark 386 takes the form of what appears to be a hand written "X" which is generated and displayed by the CPU 52, to assist the user in identifying the location at which the user's must input data.

Figure 33:
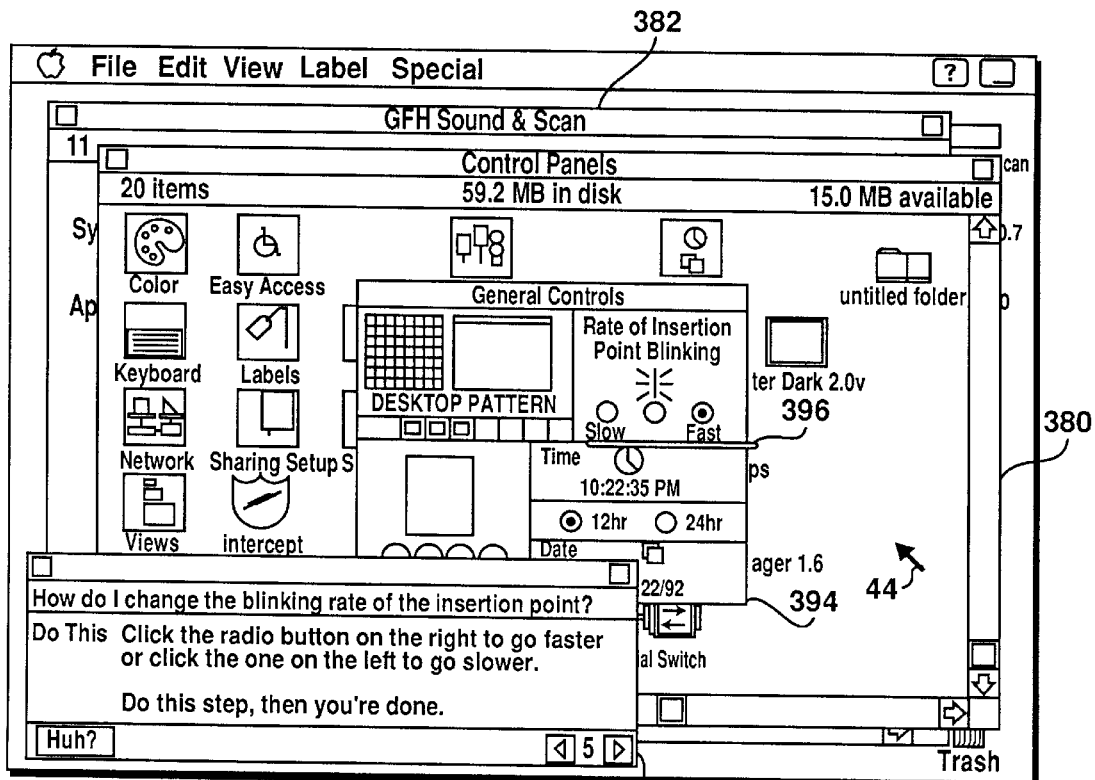
FIG. 33 illustrates the presentation window of the present invention in which a coach mark has been inserted underlining a portion of the "General Controls" window.

Referring now to FIG. 33, the present invention's use of coach marks is illustrated in which a presentation window 392 is displayed and overlies a portion of an active window entitled general controls 394. The control panels window 380 and the GFX Sound and Scan window 382 are displayed, but are not active windows. As illustrated, using the teachings of the present invention described above, the user has identified the questions "How Do I Change The Blinking Rate of the Insertion Point?", and in response, the CPU 52 has generated the presentation window 392 with instructions on how to accomplish the desired task. In addition, the CPU 52 further has generated and displayed an underline coach mark 396 to draw the user's attention to the button functions which must be operated upon to accomplish the desired task of changing the blinking rate of the insertion point.

Figure 34:
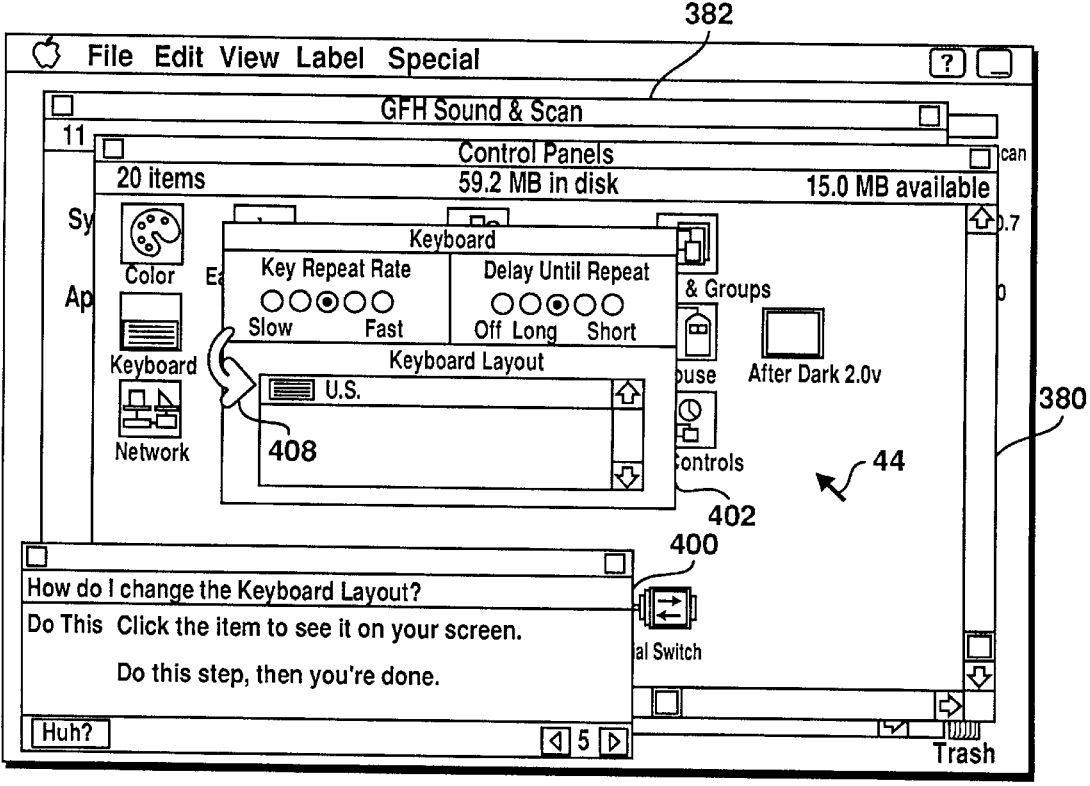
FIG. 34 is an additional illustration of the presentation window of the present invention in which a curved arrow coach mark is used to identify a portion of a window entitled "Keyboard".

With reference to FIG. 34, in response to an inquiry by the user of "How Do I Change the Keyboard Layout?", the CPU 52 then writes and displays a presentation window 400 which overlays the control panels window 380 and a portion of the GFX Sound and Scan window 382, as shown. A window entitled "Keyboard" 402 has been opened and displayed. As illustrated, to assist the user, the CPU 52 generates and displays a coach mark in the shape of an arrow 408. The arrow coach mark 408 draws the user's attention to the necessary item which must be selected to accomplish the desired task of changing the keyboard layout.

Figure 35:
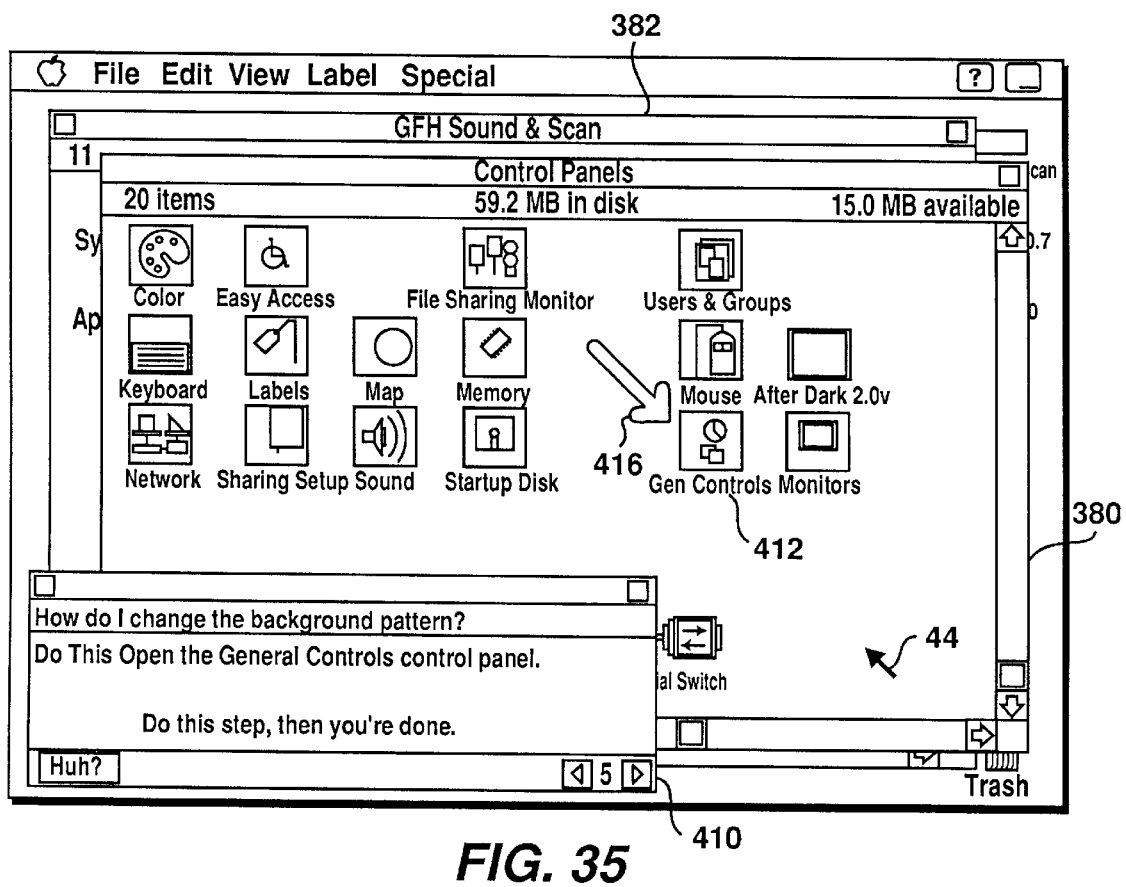
FIG. 35 is an additional illustration of the coach mark of the present invention in which a straight arrow coach mark is used to identify a selection which is required by the user to accomplish a desired function identified in the presentation window.

Similarly, in FIG. 35, through the use of the access window of the present invention (not shown), the user has selected the question "How Do I Change the Background Pattern?". In response to this inquiry, the CPU 52 generates and displays a presentation window 410 which overlays the control panels window 380 and the GFX Sound and Scan window 382. As illustrated, the presentation window 410 notifies the user that to change the background pattern, the icon entitled "General Controls" 412 must be "opened". To draw the attention of the user to the general controls icon 412, the CPU 52 generates and displays a straight arrow coach mark 416 as shown.

The use of coach marks to draw the user's attention to specific objects, functions or other display elements on screen 68, has been found to greatly assist the user in operating the computer system illustrated in FIG. 1. It will be appreciated by one skilled in the art, that although the present invention's use of coach marks has been described with reference to the help system disclosed herein, that use of coach marks is not limited to the help system as provided in this Specification. It is anticipated that the coach marks as disclosed and described in this Specification have application to a variety of graphic user interface functions, and are not limited to use in a graphic help system.

SUMMARY

Accordingly, the present invention, as described, provides a unique help based window system for use in a graphic user interface display system. The present invention's access methods, access windows and presentation windows, in combination with the attributes of the present invention, including floating windows and coach marks, provide a windowbased help user interface which assists the user. While the present invention has been described with reference to FIGS. 1 through 35, it will be appreciated that the figures are for illustration only, and do not limit the spirit and scope of the invention. For example, although the figures have, by necessity, used example windows having certain attributes, icons and/or functions, it will be appreciated that the invention is not limited by the specific examples provided. Rather, the present invention has application in any window-based graphic user interface display system. In addition, it will be noted that the present invention may be realized using a variety of computer programming languages and hardware, and is not limited to any particular hardware or software.

Moreover, it will be appreciated that certain features and aspects of the present invention, such as the present invention's use of coach marks, are not static events and are perceived by the user as having motion. Due to the limitations of a written specification, the reader is referred to a video tape entitled "Reno Macintosh Help", and a software program under the same name, submitted by the applicant concurrent with the filing of the application on which this patent is based.

What is claimed is:

1. In a computer display system having a central processing unit (CPU) coupled to a display such that data is displayed on said display in windows, a method for instructing a user on how to perform operations using said CPU, the method comprising the steps of:

A. generating and displaying an access window on said display;

B. generating and displaying within said access window a first access function, a second access function, and a third access function;

C. performing the following steps upon selection of said first access function by a user
  1) displaying a plurality of headings on said display, wherein each heading of said plurality of headings corresponds to a set of operations;
  2) displaying a plurality of phrases on said display responsive to said user selecting one of said headings, wherein said selected heading corresponds to a first set of operations, wherein each of said plurality of phrases corresponds to an operation in said first set of operations;
  3) displaying at least one presentation window that contains instruction data related to a selected phrase on said display in response to said user selecting one of said displayed phrases, said instruction data indicating how to perform the operation that corresponds to said selected phrase;

D. performing the following steps upon selection of said second access function by said user
  1) displaying a search subwindow on said display;
  2) receiving through user input a search word into said search subwindow;
  3) receiving though user input a first signal to search for said search word;
  4) displaying in said access window a plurality of phrases related to said search word, wherein each of said plurality of phrases corresponds to an operation in a second set of operations;

5) displaying at least one presentation window that contains instruction data related to a selected phrase on said display in response to said user selecting one of said displayed phrases, said instruction data indicating how to perform the operation that corresponds to said selected phrase;

E. performing the following steps upon selection of said third access function by said user
1) displaying an index window on said display, said index window having a scroll bar including:
   a plurality of characters displayed along said scroll bar;
   a slider which may be selectively positioned over at least a portion of each of said characters using slider positioning means coupled to said CPU;
2) displaying a plurality of headings that correspond to a desired character in response to receiving user input that positions said slider over a portion of said desired character;
3) displaying a plurality of phrases on said display responsive to said user selecting one of said headings, wherein said selected heading corresponds to a third set of operations, wherein each of said plurality of phrases corresponds to an operation in said third set of operations;
4) displaying at least one presentation window that contains instruction data related to a selected phrase on said display in response to said user selecting one of said displayed phrases, said instruction data indicating how to perform the operation that corresponds to said selected phrase.

* * * * *